(12) United States Patent
Rodriguez et al.

(10) Patent No.: US 7,856,116 B2
(45) Date of Patent: Dec. 21, 2010

(54) AUTHENTICATING IDENTIFICATION AND SECURITY DOCUMENTS

(75) Inventors: Tony F. Rodriguez, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 938 days.

(21) Appl. No.: 11/270,802

(22) Filed: Nov. 8, 2005

(65) Prior Publication Data

US 2006/0115110 A1 Jun. 1, 2006

Related U.S. Application Data

(60) Provisional application No. 60/626,529, filed on Nov. 9, 2004, provisional application No. 60/651,814, filed on Feb. 10, 2005, provisional application No. 60/670,773, filed on Apr. 11, 2005, provisional application No. 60/674,793, filed on Apr. 25, 2005.

(51) Int. Cl.
| | |
|---|---|
| G06K 9/00 | (2006.01) |
| G06K 9/74 | (2006.01) |
| G06F 7/04 | (2006.01) |
| B42D 15/00 | (2006.01) |
| B42D 15/10 | (2006.01) |

(52) U.S. Cl. .................. 382/100; 340/5.86; 356/71; 283/72; 283/85

(58) Field of Classification Search .............. None
See application file for complete search history.

(56) References Cited

U.S. PATENT DOCUMENTS

| | | | | |
|---|---|---|---|---|
| 4,376,582 | A | * | 3/1983 | Kirchner et al. ............ 356/71 |
| 4,539,585 | A | * | 9/1985 | Spackova et al. ........... 382/100 |
| 4,659,113 | A | | 4/1987 | Muller et al. |
| 4,723,149 | A | | 2/1988 | Harada |

(Continued)

FOREIGN PATENT DOCUMENTS

EP   0279526   8/1988

(Continued)

OTHER PUBLICATIONS

PCT/US05/40547 International Search Report, dated Jun. 6, 2007, 9 pages.

(Continued)

*Primary Examiner*—Vikkram Bali
*Assistant Examiner*—Michelle Entezari

(57) ABSTRACT

The application discloses identification and security documents and methods and systems for authenticating such identification and security documents. In one implementation, a document includes a first surface; and a second surface. The first surface comprises a first set of print structures and a second set of print structures. The first set of print structures and the second set of print structures cooperate to obscure the location on the first surface of the second set of print structures. The second set of print structures is arranged on the first surface so as to provide a reflection pattern. In one example, the reflection pattern includes a diffraction grating. The second set of print structures is preferably provided on the first surface with metallic ink. In other implementations a financial instrument or identification document is provided with an organic light emitting diode (OLED) array. The OLED array displays information thereon. The information is preferably correlated to the information on or in the financial instrument or identification document.

17 Claims, 15 Drawing Sheets

U.S. PATENT DOCUMENTS

| | | | |
|---|---|---|---|
| 4,820,912 A | 4/1989 | Samyn | |
| 4,837,840 A | 6/1989 | Goldman | |
| 4,973,851 A * | 11/1990 | Lee | 250/556 |
| 5,424,807 A | 6/1995 | Ohmura | |
| 5,521,984 A | 5/1996 | Denenberg | |
| 5,568,268 A | 10/1996 | Tsuji et al. | |
| 5,583,614 A | 12/1996 | Hasuo et al. | |
| 5,633,952 A | 5/1997 | Outa | |
| 5,636,292 A | 6/1997 | Rhoads | |
| 5,640,467 A | 6/1997 | Yamashia | |
| 5,710,834 A | 1/1998 | Rhoads | |
| 5,748,763 A | 5/1998 | Rhoads | |
| 5,748,783 A | 5/1998 | Rhoads | |
| 5,809,160 A | 9/1998 | Powell et al. | |
| 5,822,436 A | 10/1998 | Rhoads | |
| 5,832,119 A | 11/1998 | Rhoads | |
| 5,841,978 A | 11/1998 | Rhoads | |
| 5,850,481 A | 12/1998 | Rhoads | |
| 5,862,260 A | 1/1999 | Rhoads | |
| 6,026,193 A | 2/2000 | Rhoads | |
| 6,114,018 A | 9/2000 | Phillips et al. | |
| 6,122,403 A | 9/2000 | Rhoads | |
| 6,385,329 B1 | 5/2002 | Sharma et al. | |
| 6,408,082 B1 | 6/2002 | Rhoads et al. | |
| 6,411,725 B1 | 6/2002 | Rhoads | |
| 6,449,377 B1 | 9/2002 | Rhoads | |
| 6,608,911 B2 | 8/2003 | Lofgren et al. | |
| 6,614,914 B1 | 9/2003 | Rhoads et al. | |
| 6,650,763 B2 | 11/2003 | Echizen et al. | |
| 6,664,564 B2 | 12/2003 | Peng | |
| 6,670,052 B2 | 12/2003 | Hirose et al. | |
| 6,704,869 B2 | 3/2004 | Rhoads et al. | |
| 6,754,377 B2 | 6/2004 | Rhoads | |
| 6,774,392 B2 | 8/2004 | Humbs et al. | |
| 6,794,676 B2 | 9/2004 | Pakbaz et al. | |
| 6,973,198 B2 * | 12/2005 | Patton et al. | 382/100 |
| 6,985,607 B2 * | 1/2006 | Alasia et al. | 382/112 |
| 7,084,903 B2 | 8/2006 | Narayanaswami | |
| 7,133,536 B2 * | 11/2006 | Moon et al. | 382/100 |
| 7,162,035 B1 | 1/2007 | Durst et al. | |
| 7,194,106 B2 * | 3/2007 | Brundage et al. | 382/100 |
| 7,283,657 B1 * | 10/2007 | Carlson | 382/141 |
| 7,315,629 B2 * | 1/2008 | Alasia et al. | 382/112 |
| 2002/0164052 A1 | 11/2002 | Reed et al. | |
| 2003/0002708 A1 * | 1/2003 | Pasqua | 382/100 |
| 2003/0035564 A1 | 2/2003 | Honsinger | |
| 2003/0178495 A1 | 9/2003 | Jones et al. | |
| 2004/0221244 A1 | 11/2004 | Baldino | |
| 2004/0250080 A1 | 12/2004 | Levy et al. | |
| 2004/0263911 A1 | 12/2004 | Rodriguez et al. | |
| 2005/0008191 A1 * | 1/2005 | Wendt | 382/100 |
| 2005/0041835 A1 | 2/2005 | Reed et al. | |
| 2005/0063562 A1 | 3/2005 | Brunk et al. | |
| 2005/0190914 A1 | 9/2005 | Chen | |
| 2005/0210255 A1 | 9/2005 | Kirovski | |
| 2007/0201720 A1 | 8/2007 | Rodriguez et al. | |

FOREIGN PATENT DOCUMENTS

| | | |
|---|---|---|
| FR | 2774691 | 8/1999 |
| WO | WO 03/005291 | 1/2003 |
| WO | WO2006053023 | 5/2006 |

OTHER PUBLICATIONS

Chen et al., "Certifying Authenticity via Fiber-Infused Paper," ACM SIGecom Exchanges, vol. 5, No. 3, Apr. 2005, pp. 29-37.

July 7, 2008 Extended European Search Report from assignee's European Patent Application No. EP 05818684.2 (corresponding to PCT/US2005/040547, published as W02006/053023).

Mikkilineni, et al., "Printing identification based on graylevel co-occurrence features for security and forensic applications," in Security, Stenography, and Watermarking of Multimedia Contents VII, edited by Edward J. Delp III, Ping Wah Wong, Proceedings of the SPIE-IS&T Electronic Imaging, SPIE vol. 5681, pp. 430-440 (2005).

U.S. Appl. No. 60/626,529, filed Nov. 9, 2004.
U.S. Appl. No. 60/651,814, filed Feb. 10, 2005.
U.S. Appl. No. 60/670,773, filed Apr. 11, 2005.
U.S. Appl. No. 60/674,793, filed Apr. 25, 2005.

* cited by examiner

Security or
Identification
Document

Security Fiber

= Unique Representation
or Characteristics

AUTHENTICATING IDENTIFICATION AND SECURITY DOCUMENTS

RELATED APPLICATION DATA

This application claims the benefit of U.S. Provisional Patent Application Nos. 60/626,529, filed Nov. 9, 2004; 60/651,814, filed Feb. 10, 2005; 60/670,773, filed Apr. 11, 2005; and 60/674,793, filed Apr. 25, 2005. This application is related to assignee's U.S. Pat. No. 6,754,377 (including Appendix A); U.S. Pat. Nos. 5,850,481; 5,636,292; 5,710,834; 5,748,763; 5,748,783; 5,841,978; 5,832,119; 5,822,436 (including the entire certificate of correction); U.S. Pat. Nos. 5,862,260; 6,122,403; 6,026,193; 5,809,160; and publication Nos. US 2004-0250080 A1 and US 2005-0041835 A1. Each of these patent documents is hereby incorporated by reference in its entirety.

BACKGROUND AND SUMMARY OF THE INVENTION

The present invention relates to steganography, digital watermarking and security enhancements.

Digital watermarking is a form of steganography that encompasses a great variety of techniques by which plural bits of digital data are hidden in some other object without leaving human-apparent evidence of alteration.

Digital watermarking may be used to modify media content to embed a message or machine-readable code into the content. The content may be modified such that the embedded code is imperceptible or nearly imperceptible to the user, yet may be detected through an automated detection process.

Most commonly, digital watermarking is applied to media such as images, audio signals, and video signals. However, it may also be applied to other types of data, including documents (e.g., through line, word or character shifting, through texturing, graphics, or backgrounds, etc.), software, multi-dimensional graphics models, and surface textures of objects.

Digital watermarking systems typically have two primary components: an embedding component that embeds the watermark in the media content, and a reading component that detects and reads the embedded watermark. The embedding component embeds a watermark by altering data samples of the media content (e.g., pixel values, DCT coefficients, wavelet coefficients, etc). The reading component analyzes content to detect whether a watermark is present. In applications where the watermark encodes information, the reading component extracts this information from the detected watermark. Commonly assigned U.S. Pat. Nos. 6,614,914 and 5,862,260 discloses various encoding and decoding techniques.

Some aspects of the invention relate to inconspicuously embedding binary data in line art images (such as are used in currency, graphics, identification documents and the like), and associated methods/systems for decoding such data from such images. Other aspects of the invention relate to security features and confidence clues for identification documents, currency, graphics and the like. Still other aspects of the invention provide related systems and methods.

In the following disclosure it should be understood that references to watermarking encompass not only the assignee's watermarking technology, but can likewise be practiced with any other watermarking technology.

Some of the prior art in image watermarking has focused on pixelated imagery (e.g. bit-mapped images, JPEG/MPEG imagery, VGA/SVGA display devices, etc.). In some watermarking techniques, the luminance or color values of component pixels are slightly changed to effect subliminal encoding of binary data through the image. (This encoding can be done directly in the pixel domain, or in another domain, such as the DCT domain.) In some systems, isolated pixels are changed in accordance with one or more bits of the binary data; in others, plural domain-related groupings of pixels (e.g. locally adjoining, or corresponding to a given DCT component) are so changed. In all cases, however, pixels have served as the ultimate carriers of the embedded data.

One inventive technique for authentication and copy detection employs ink pairs to provide authentication clues for security documents (e.g., banknotes, currency, checks, financial instruments, etc.) and identification documents (e.g., driver's license, passport, visa, ID card, bank cards, etc.). An ink pair cooperates to provide a diffraction grating (or other reflective pattern) while obscuring the location of a metallic ink—one of two inks in an ink pair.

According to one aspect, a document includes a first surface and a second surface. The first surface comprises a first set of print structures and a second set of print structures. The first set of print structures and the second set of print structures cooperate to obscure the location on the first surface of the second set of print structures. The second set of print structures is arranged on the first surface so as to provide a reflective pattern.

In a related example, the reflective pattern forms a diffraction grating.

In another related example, the first set of print structures is provided on the first surface with a first ink and the second set of print structures is provided on the first surface with a second different ink. The second different ink is a metallic ink.

In still another related example, the first set of print structures and the second set of print structures collective convey a steganographic signal (e.g., a digital watermark) that is discernable from optical scan data representing at least a first portion of the first surface.

According to another aspect of the invention, a photo identification document includes a first surface and a second surface. The second surface includes a photographic representation (e.g., a picture or photo) of an authorized bearer of the photo identification document. The first surface comprises a first set of print structures provided thereon with a first ink having a first color and a second set of print structures provided thereon with a second ink having a second color. The first color and the second color are visually similar colors. The first set of print structures and the second set of print structures cooperate to obscure the location on the first surface of the second set of print structures. The second ink comprises metallic characteristics so when arranged on the first surface, the second set of print structures provide a diffraction grating.

According to still another aspect of the invention, a security document (e.g., a banknote, check, note, draft, etc.) includes a first surface; a first set of print structures provided on the first surface with a first ink having a first color; and a second set of print structures provided on the first surface with a second ink having a second color. The first color and the second color are visually similar colors. The first set of print structures and the second set of print structures cooperate to obscure the location on the first surface of the second set of print structures. The second ink comprises metallic characteristics so when arranged on the first surface, the second set of print structures provide a pattern that, in response to a signal or radiation, reflects a predetermined signal or pattern.

The foregoing features and advantages of the invention will be more readily apparent from the following detailed description, which proceeds with reference to the accompanying drawings.

DETAILED DESCRIPTION

Line Art

While pixelated imagery is a relatively recent development, line art goes back centuries. One familiar example is U.S. paper currency. On the one dollar banknote, for example, line art is used in several different ways. One is to form intricate webbing patterns around the margin of the note (generally comprised of light lines on dark background). Another is so form grayscale imagery, such as the portrait of George Washington (generally comprised of dark lines on a light background).

Figure 1A:
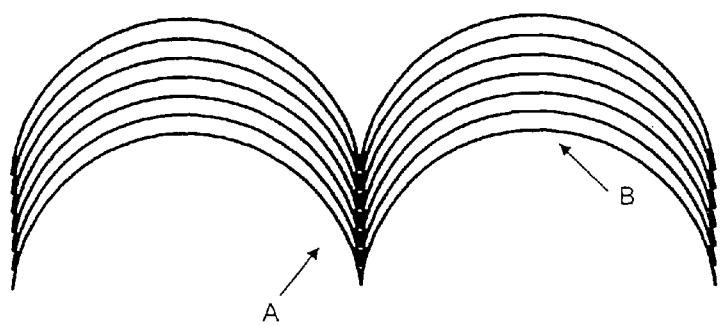
FIGS. 1A and 1B show prior art techniques for achieving grayscale effects using line art.
Figure 1B:
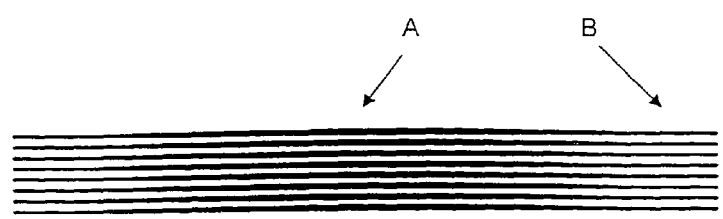

There are two basic ways to simulate grayscales in line art. One is to change the relative spacings of the lines to effect a lightening or darkening of an image region. FIG. 1A shows such an arrangement; area B looks darker than area A due to the closer spacings of the component lines. The other technique is to change the widths of the component lines—wider lines resulting in darker areas and narrower lines resulting in lighter areas. FIG. 1B shows such an arrangement. Again, area B looks darker than area A, this time due to the greater widths of the component lines. These techniques are often used together.

Some specific embodiments of steganographic encoding using line art techniques are provided below.

One embodiment posits a virtual grid of points imposed on a line art image (e.g. a U.S. one dollar banknote), with the points spaced at regular intervals in vertical and horizontal directions. (The horizontal and vertical intervals need not be equal.) The virtual points may be imposed over some or all of the bill at equal vertical and horizontal spacings of 250 μm. In regions of the banknote having line art, the component lines of the art snake in and amongst these virtual grid points.

Each grid point is considered to be the center of a rounded-square region. The luminance of the region is a function of the proximity of any line(s) within the boundary of the region to the region's centerpoint, and the thickness of the line(s).

To change the luminance of the region, the contour of the line(s) is changed slightly within the region. In particular, the line is made slightly thicker to decrease luminance; or thinner to increase luminance. (Unless otherwise noted, dark lines on light backgrounds are presumed.) The ability to effect these slight changes is then employed, in accordance with known pixelation-based watermarking techniques, to encode binary data in the line art. If such a banknote is thereafter scanned by a scanner, the values of the pixel data produced by the scanner will reflect the foregoing alterations in luminance values, permitting embedded watermark data to be decoded.

In an alternative embodiment, the line widths are not changed. Instead, the positions of the lines are shifted slightly towards or away from certain virtual grid points to effect an increase or decrease in the corresponding area's luminosity, with the same effect. Other embodiments are also detailed.

By the techniques disclosed herein, line art images can be encoded to subliminally convey binary data. This capability permits various hardware systems to recognize banknotes, and to change or limit their actions in a predetermined manner (e.g. a photocopier equipped with this capability can refuse to reproduce banknotes, or can insert forensic tracer data in the copy).

Advances in digital imaging and printing technologies have vastly improved desktop publishing, yet have provided counterfeiters with low cost technologies for illegally counterfeiting security documents (e.g., banknotes, checks, notes, drafts, and other financial instruments) and identification documents (e.g., driver's licenses, passports, ID documents, visa, etc.). While there are many technologies that make counterfeiting more difficult, there is a need for technologies that can quickly and accurately detect originals and distinguish copies. Preferably, these technologies integrate with existing processes for handling such documents.

Figure 2:
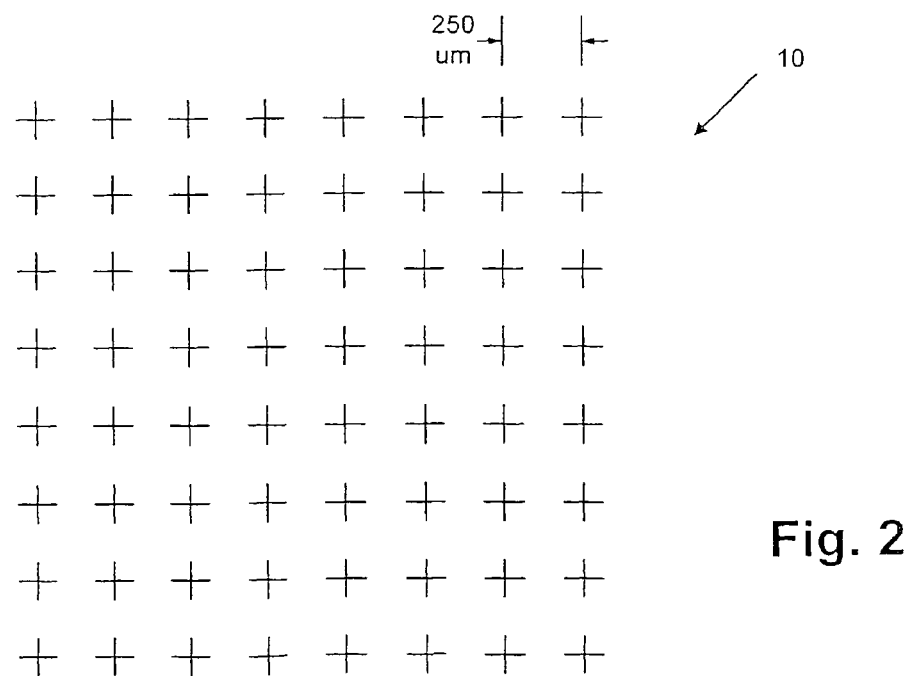
FIG. 2 shows a virtual array of grid points that can be imposed on an image according to one embodiment of the present invention.

Referring to FIG. 2, an illustrative form of the invention employs a grid 10 of imaginary reference points arrayed over a line art image. The spacing between points is 250 μm in the illustrated arrangement, but greater or lesser spacings can of course be used.

Figure 3:
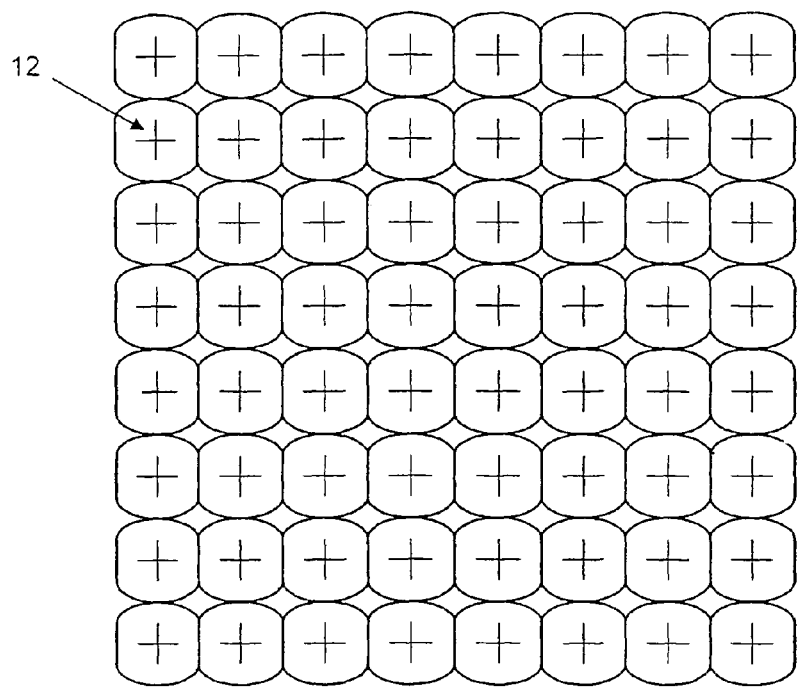
FIG. 3 shows a virtual array of regions that can be imposed on an image according to the FIG. 2 embodiment.

Associated with each grid point is a surrounding region 12, shown in FIG. 3. As described below, the luminosity (or reflectance) of each of these regions 12 is slightly changed to effect the subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

Figures 4, 5, 6:
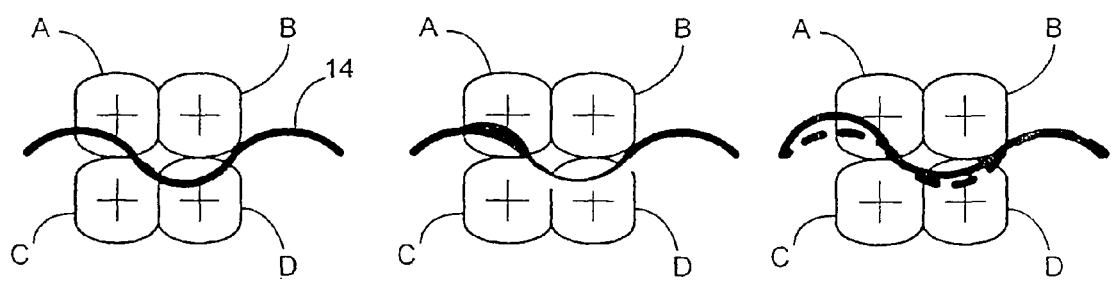
FIG. 4 shows an excerpt of FIG. 3 with a line from a line art image passing therethrough.
FIG. 5 shows changes to the width of the line of FIG. 3 to effect watermark encoding according to one embodiment of the present invention.
FIG. 6 shows changes to the position of the line of FIG. 3 to effect watermark encoding according to another embodiment of the present invention.

FIG. 4 is a magnified view of an excerpt of FIG. 3, showing a line 14 passing through the grid of points. The width of the line, of course, depends on the particular image of which it is a part. The illustrated line is about 25 μm in width; greater or lesser widths can naturally be used.

In a first embodiment of the invention, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image.

In an exemplary algorithm, the binary data is represented as a sequence of −1s and 1s, instead of 0s and 1s. (The binary data can comprise a single datum, but more typically comprises several. In an illustrative embodiment, the data comprises 100 bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in U.S. Pat. No. 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will modulate the line width 3-50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Banknotes are different from photographs in that the art need not convey photorealism. Thus, banknotes can be encoded with higher energy than is used in watermarking photographs, provided the result is still aesthetically satisfactory. To illustrate, localized luminance changes on the order of 10% are possible in banknotes, while such a level of watermark energy in photographs would generally be considered unacceptable. In some contexts, localized luminance changes of 20, 30, 50 or even 100% are acceptable.)

In the illustrated embodiment, the change to line width is a function solely of the tweak to be applied to a single region. Thus, if a line passes through any part of a region to which a tweak of 2% is to be applied, the line width in that region is changed to effect the 2% luminance difference. In variant embodiments, the change in line width is a function of the line's position in the region. In particular, the change in line width is a function of the distance between the region's center grid point and the line's closest approach to that point. If the line passes through the grid point, the full 2% change is effected. At successively greater distances, successively less change is applied. The manner in which the magnitude of the tweak changes as a function of line position within the region can be determined by applying one of various interpolation algorithms, such as the bi-linear, bi-cubic, cubic splines, custom curve, etc.

In other variant embodiments, the change in line width in a given region is a weighted function of the tweaks for adjoining or surrounding regions. Thus, the line width in one region may be increased or decreased in accordance with a tweak value corresponding to one or more adjoining regions.

Combinations of the foregoing embodiments can also be employed.

In the foregoing embodiments, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the image is zero, so no generalized lightening or darkening of the image is apparent. The localized changes in luminosity are so minute in magnitude, and localized in position, that they are essentially invisible (e.g. inconspicuous/subliminal) to human viewers.

An alternative embodiment is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3-50 µm.

One way to think of the FIG. 6 embodiment is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

Each of the variants discussed above in connection with FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further embodiment, the luminance in each region is changed while leaving the line unchanged. This can be effected by sprinkling tiny dots of ink in the otherwise-vacant parts of the region. In high quality printing, of the type used with banknotes, droplets on the order of 3 µm in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.)

In a variant of the speckling technique, very thin mesh lines can be inserted in the artwork—again to slightly change the luminance of one or more regions.

Although not previously mentioned, it is contemplated that the banknote will include some manner of calibration information to facilitate registration of the image for decoding. This calibration information can be steganographic or overt. Several techniques for steganographically embedding calibration information are disclosed in my prior patents and applications. Other techniques can be found in others of the cited work.

To decode watermark data, the encoded line art image must be converted into electronic form for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the image. Most inexpensive consumer scanners have a resolution of 300 dots per inch (dpi), or a center to center spacing of component photodetectors of about 84 µm. Higher quality scanners of the sort found in most professional imaging equipment and photocopiers have resolutions of 600 dpi (42 µm), 1200 dpi (21 µm), or better.

Taking the example of a 300 dpi scanner (84 µm photodetector spacing), each 250 µm region 12 on the banknote will correspond to about a 3×3 array of photodetector samples. Naturally, only in rare instances will a given region be physically registered with the scanner so that nine photodetector samples capture the luminance in that region, and nothing else. More commonly, the line art is skewed with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the line art is collected in a two dimensional array and processed—according to one of the techniques disclosed in my prior patents and applications—to detect the embedded calibration information. The array is then processed to effect a virtual re-registration of the image data. A software program then analyzes the statistics of the re-registered data (using the techniques disclosed in my prior writings) to extract the bits of the embedded data.

In a variant embodiment, the scanned data is not assembled in a complete array prior to the processing. Instead, it is processed in real-time, as it is generated, in order to detect embedded watermark data without delay. (Depending on the parameters of the scanner, it may be necessary to scan a half-inch or so of the line art image before the statistics of the resulting data unambiguously indicate the presence of a watermark.)

In accordance with another aspect of the invention, various hardware devices are provided with the capability to recognize embedded watermark data in any line art images they process, and to respond accordingly.

One example is a color photocopier. Such devices employ a color scanner to generate sampled (pixel) data corresponding to an input media (e.g. a dollar bill). If watermark data associated with a banknote is detected, the photocopier can take one or more steps.

One option is simply to interrupt copying, and display a message reminding the operator that it is illegal to reproduce currency.

Another option is to dial a remote service and report the attempted reproduction of a banknote. Photocopiers with dial-out capabilities are known in the art (e.g. U.S. Pat. No. 5,305,199) and are readily adapted to this purpose. The remote service can be an independent service, or can be a government agency.

Figure 7:
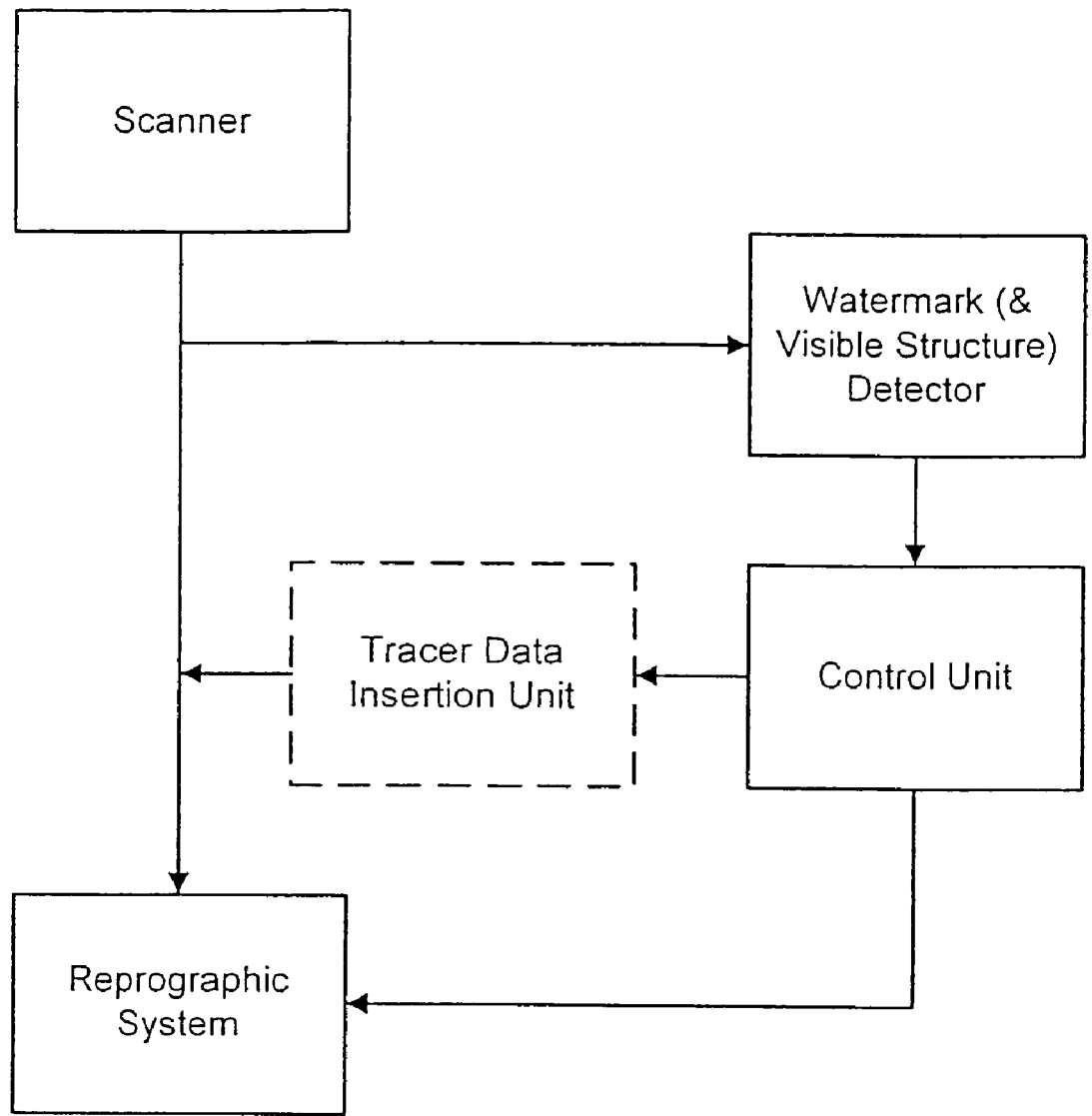
FIG. 7 is a block diagram of a photocopier according to another embodiment of the invention.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote. (Such an arrangement is shown in FIG. 7.)

Desirably, the scan data is analyzed on a line-by-line basis in order to identify illicit photocopying with a minimum of delay. If a banknote is scanned, one or more lines of scanner output data may be provided to the photocopier's reprographic unit before the banknote detection decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with banknotes.

For both the scanner and printer devices, response strategies can include disabling operation, or inserting tracer information. (Such devices typically do not have dial-out capabilities.)

Again, it is desirable to process the scanner or printer data as it becomes available, so as to detect any banknote processing with a minimum of delay. Again, there will be some lag time before a detection decision is made. Accordingly, the scanner or printer output will be comprised of two parts, one without the tracer data, and another with the tracer data.

We sometimes refer to the above techniques as "Line Width Modulation" or "LWM." And, as mentioned above, other techniques for embedding information may include spots and holes for floods and blank areas and directed holes.

Another technique, as disclosed in assignee's U.S. patent application Ser. No. 10/723,181 (published as US 2004-0263911 A1) is referred to as "Line Continuity Modulation or "LCM". This method embeds watermarks by modulating a continuity of line structures. For example, an auxiliary signal is embedded in a line image by selectively breaking the lines where the embedding location value is zero. Another example encodes watermark information by introducing subtle modifications in a design structures to create light and dark areas corresponding to watermark components or data carriers.

LWM and LCM can be thought of as part of a broad class of techniques that encode a digital watermark by modulating characteristics of a design structure to create subtle light and dark areas corresponding to binary 1s and 0s.

Additional inventive techniques and combinations are described below.

Figure 8:
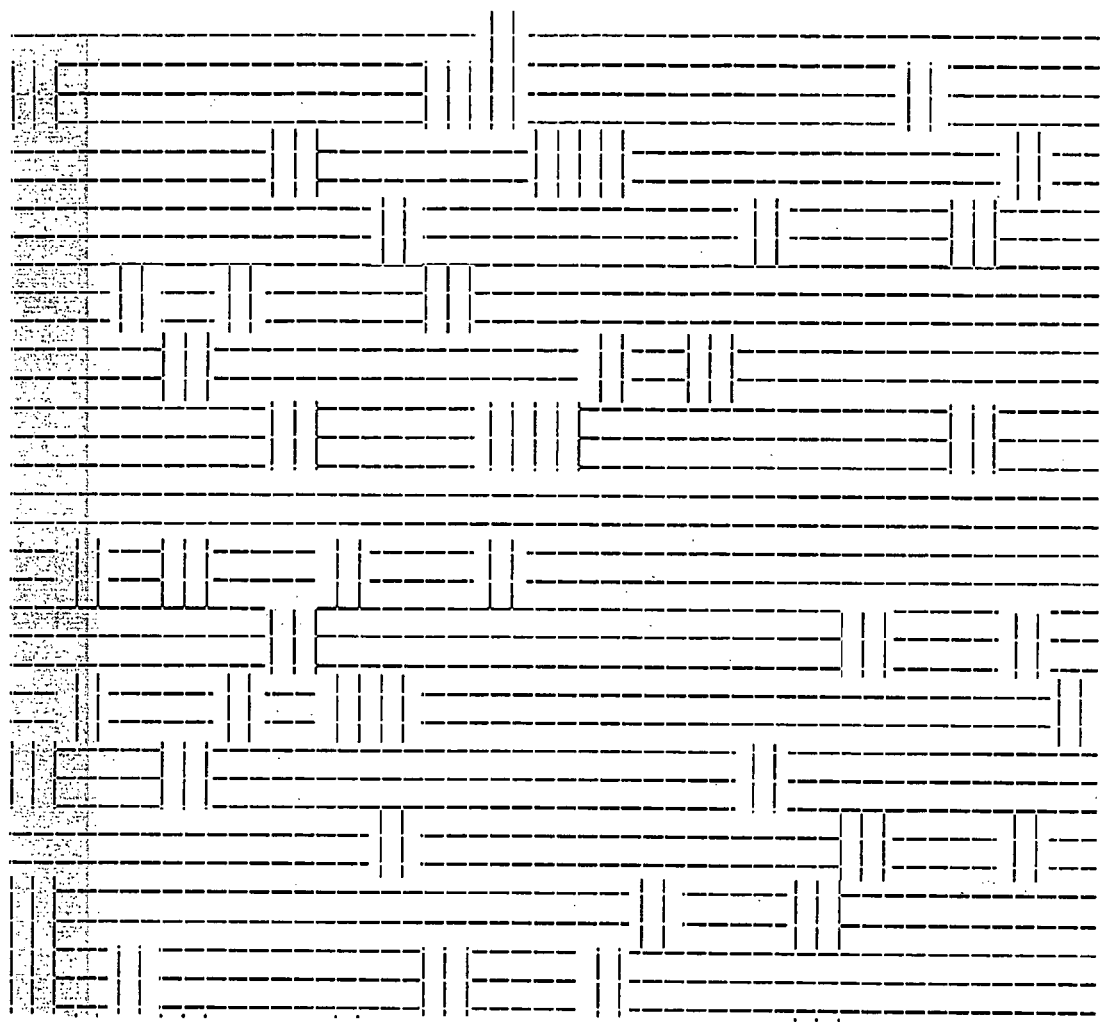
FIG. 8 shows a line angle modulation watermark signal.

Line Angle Modulation—Line structures often have a dominant angle or orientation. One way of embedding watermark information is to vary (modulate) the line angles within the design to create 0s and 1s. For example, the vertical lines represent 0s and the horizontal lines represent 1s (or a distance between horizontal lines represents data.) In another implementation a transition between a first angle (e.g., a horizontal) and a second angle (e.g., a vertical) conveys data. In still another implementation, lines or graphics can be oriented with respect to a know angle of structure provided on a document. For example, a visible fiducial or graphic provides a base orientation through its own orientation. Then, orientation of line structures around the document are evaluated to determine their orientation with respect to the visible fiducially or graphic. These techniques can be used to embed robust watermarks. This method embeds a watermark using Line Angle Modulation such that the watermark is preferably not visible in the original, e.g., the line structures appear as a uniform field in the original document. After copying, due to limitations of the copying process, certain angles alias, and cause the watermark to appear in the copy. An example of such a watermark is shown in FIG. 8. A watermark Line Frequency Modulation—A digital watermark can also be embedded by modulating the frequency of the line structures. This technique provides additional flexibility in tying the watermark feature closely with the design structures. For example, for line structures having constant width (thickness), the frequency of the structures can be increased or decreased to embed 1s and 0s. The frequency is used to convey the data.

An alternative method of using frequency modulation "warps" or contorts an image to carry the watermark information. Consider that a design is laid out on a stretchable surface. Now imagine compressing the design structures in some areas and stretching the design structures in other areas to create dense and sparse regions respectively. Compressed regions will appear darker (more ink in given area) while stretched regions appear lighter (less ink in given area). This process can be used to encode watermark information.

Line Thickness Modulation—This technique is a modification of the LWM technique. Here, the width of each line structure, or of a set of line structures, is maintained constant throughout its length. However, the width of adjacent line structures are varied to embed 0s and 1s. In contrast with LWM, this technique may apply to sparser design structures.

Combination of techniques—Multiple techniques can be combined in the design elements throughout the design depending upon the characteristics of the design structures. These techniques can be used to embed multiple watermarks at different resolutions as well. For example, LCM can be used for higher resolution watermarks whereas Line Frequency Modulation and Line Thickness Modulation are favorable for encoding lower resolution watermarks.

Some possible combinations of this disclosure include the following. Of course, other combinations will be evident to those of ordinary skill in the art. We reserve the right to present these and other combinations as claims in this or continuing applications.

A1. A method of watermarking an image to convey auxiliary data, wherein the image including a plurality of line elements, the method comprises:

determining a base line width;

varying a frequency of at least a set of line element relative to the base line width to convey a plural-bit message.

A2. A method of watermarking an image to convey auxiliary data, wherein the image including a plurality of elements, the method comprises:

receiving the image;

selectively contorting the image to provide relatively dense and sparse regions of elements, wherein the dense and sparse regions convey a plural-bit message.

A3. The method of A2, wherein said contorting comprises at least one of resizing, scaling, stretching and warping.

A4. A method comprising:

determining a base orientation for media from a graphic or visible fiducial;

determining an orientation for a plurality of line structures relative to the base orientation, and deciphering a plural-bit code based on the foregoing.

Document Authentication

Cell phones continue to proliferate throughout the world's population. Many of today's cell phones and personal digital assistants (PDAs) are sophisticated computing devices, including optical sensors (e.g., CCD or CMOS sensors) for image and video capture. These optical sensors typically provide a color (or monochrome) output. A few examples include NEC's 525 phone, Fujitsu's F900 phone and Nokia's 3620 phone. Of course, these examples are provided by way of example only. Many of these phones and PDAs include robust processing and memory capability, allowing for sophisticated signal processing (e.g., digital watermark decoding and pattern recognition). In the case of color images or video, the color channels include, e.g., Red, Green and Blue. The image or video is typically displayed to a user of the device via a display. A population, armed with these types of mobile computing devices, have new authentication techniques available to them.

In the past, identification documents and banknotes (sometimes referred to hereafter as "currency") have included several lines of defensive (or authenticating) security features. First line-security features, those that are distinguishable by casual inspection, include optical variable devices (OVD), including holograms, kinegrams, optical variable ink, visible or analog watermarks, and intaglio inks. Second line-security features are generally more covert, like digital watermarks.

The proliferation of mobile computing devices allows us to blur these lines of defenses.

Consider an identification document that includes a plurality of colors (e.g., via ink or dye) provided on a first surface. One of the colors is yellow. We provide a visual graphic in the yellow channel, e.g., like an image of an eagle or snake. The yellow graphic is hard—but not impossible—to see with an unaided human eye. The visual graphic might also be further obscured by adjusting an overall luminance in an area in which the graphic is printed by offsetting or lowering the color values of other colors (e.g., black) in that area. Related techniques are disclosed in assignee's U.S. Published Patent Application No. US 2002-0164052 A1 and in PCT Application No. PCT/US02/20832 (published in English as WO 03/005291). Each of these patent documents is hereby incorporated by reference.

A consumer—armed with an imaging mobile device—captures optical scan data representing the identification document. As mentioned above, the mobile device includes an optical sensor that provides a plurality of colors (e.g., RGB). The mobile device selects the blue channel for display (or at least emphasizes the blue channel) to the consumer. (Imaging software, e.g., products by Adobe provided tools to allow separation of color channels. Other software provides similar tools. Indeed, display drivers can be programmed to selectively display a particular color channel like a blue color channel.) The yellow channel graphic is pronounced in the blue channel display, since the yellow color graphic results in more light being absorbed, which is readily detectable in the blue channel. The consumer views the graphic on her mobile display to ascertain an authentication clue. For example, the mere presence of the graphic provides some confidence that the identification document is authentic.

A related approach can be used with ultraviolet or infrared inks, if the mobile optical sensor is fitted (e.g., IR or UV filtering) to accommodate such.

Printing alignment continues to be a cornerstone in the secure printing world. Precise or aligned printing can be used to provide precisely located features, fine-lined graphics, etc. Precise front to back alignment also provides authentication clues.

An improvement is to combine aligned printing with digital watermarking. In a first implementation, a visual feature is provided on a surface of an identification document. The visual feature might be obscured, as discussed above with the yellow channel graphic. The identification document includes steganographic encoding, perhaps in the form of digital watermarking. The encoding includes plural-bit data. The data carries or links to registration information associated or cooperating with the visual feature. In a first example, the registration information includes information to reproduce a related feature. In this example, the first feature includes a first geometric pattern (like a circle). The registration information includes spatial coordinates and dimensions for a second feature. The second feature preferably includes a second geometric pattern (like a matching circle).

A mobile device captures optical scan data representing the encoded identification document. Software (or dedicated circuitry) executing on a mobile device decodes the steganographic encoding from the captured optical scan data to obtain the registration information. Software uses the registration information to generate (e.g., graphically displayed relative to the image of the first feature) the second geometric pattern and align it for display on the mobile device. In some cases the first and second patterns are intended to overlap or intertwine in an expected manner. Misalignment or mis-registration relative to the first feature indicates a potential counterfeit.

(Unless extreme care is taken with the printing of the first feature—and corresponding alignment of the second feature—the expected alignment of the first and second features may be spatially mis-registered. We note here that alignment and registration of the second feature may be eased with pattern recognition software. For example, the pattern recognition software identifies the first feature based on its shape (or pattern). A placement location of the second feature can be based on a location of the first feature, once found. Edge detection software can also be used to determine a location of the first feature. An edge of the document or feature can be used to identify a location. If a counterfeiter makes the first feature too small, or offsets the first feature, the rendering of the second feature will not correspond as expected. Of course, we can use a registration component carried by steganographic encoding to resize, translate or rotate the captured imagery if needed.)

In some cases, the first feature is laid down on a substrate using a first printing plate (and color), while the steganographic encoding is laid down on the substrate using a second printing plate (and color). In the first example discussed above, registration or alignment between the two printing plates provides additional security, since alignment is required in order to properly generate a second feature relative to the first feature.

Figure 9A:
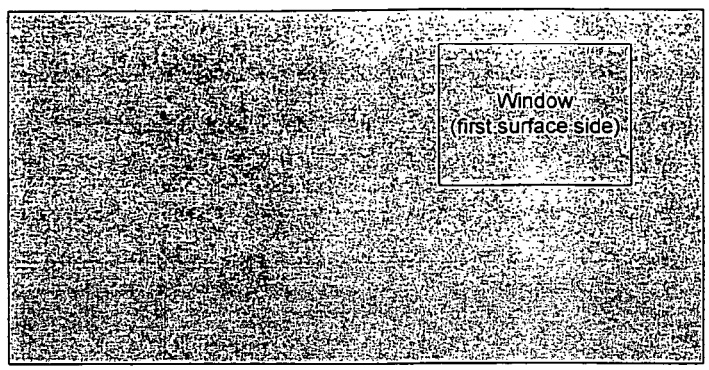
FIG. 9a shows a first surface of a document including a transparent or semi-transparent window.

Another example uses printing alignment of a front surface and a back surface. Consider the document in FIGS. 9a and 9b. FIG. 9a shows a first surface (e.g., front surface) of an identification document. The document includes a first window. The window may include a transparent or semi-transparent polymer or may include a pressed area (e.g., pressed paper) to provide some transparency, perhaps aided by a light source. The first surface window may include a graphic, image, texturing or background printing. The graphic, image, texturing or background printing includes first steganographic encoding.

Figure 9B:
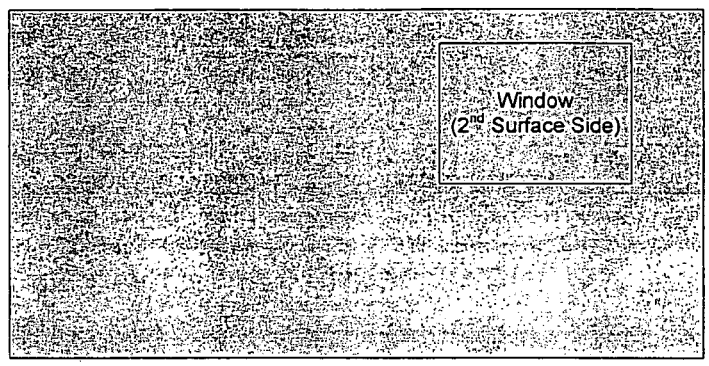
FIG. 9b shows of a second surface of the document including the transparent or semi-transparent window.

FIG. 9b shows a second surface (e.g., back surface) of the identification document. The window is seen on the second surface as well. The second surface window may include a graphic, image, texturing or background printing. The graphic, image, texturing or background printing includes second steganographic encoding.

The first and second steganographic encodings cooperate to provide an authentication clue.

For example, a mobile device captures an image of the window from either a viewpoint of the first or second surface. Since the window is transparent or semi-transparent, both the first and second stegangraphic encoding is optically captured with a single-sided scan of the window. The spatial relation of the first and second steganographic encoding can be used to determine whether the document was properly registered when originally printed. Mis-registration signals a potential counterfeit document.

The first and second steganographic encoding can cooperate in other ways as well. For example, the first steganographic encoding may include a plural-bit payload that indicates a relative and expected spatial location of the second steganographic encoding.

The scale, rotation and/or translation of the first and second steganographic encoding, relative to each other, is another indication of original printing misalignment (a telltale sign of a counterfeited document). Watermark orientation parameters are even further discussed, e.g., in assignee's U.S. Pat. Nos. 6,614,914, 6,704,869 and 6,385,329, which are each hereby incorporated by reference.

Of course, plural-bit payloads, each carried by the first and second steganographic encoding can be redundant or cross-correlated for authentication.

Digital watermarking can also be used to provide anonymity for currency substitutes. We envision users to one-day print cash substitutes at home, at mall kiosks or on the road.

Digital watermarks are used in these situations to provide related information. A digital watermark may include a message or payload that is used to indicate a "one-use" only requirement. The message, once decoded, is used to interrogate a data structure which keeps track of whether the cash substitute has ever been used before. The watermark may also include a "good-until" indicator, issuing authority, amount, etc.

Some possible combinations of this disclosure include the following. Of course, other combinations will be evident to those of ordinary skill in the art. We reserve the right to present these and other combinations as claims in this or continuing applications.

B1. An identification document or banknote comprising:
a substrate including a first surface and a second surface;
a transparent or semi-transparent window disposed in the substrate, wherein the window is viewable from both the first surface and the second surface,
first steganographic encoding on the first surface window side; and
second steganographic encoding on the second surface window side.

B2. The document or banknote of B1, wherein the first steganographic encoding and the second steganographic encoding cooperate to yield authentication clues.

B3. The document or banknote of B2, wherein the cooperation provides a relative spatial alignment of the first steganographic encoding and the second steganographic encoding.

B4. The document or banknote of B3, wherein the relative spatial alignment of the first steganographic encoding and the second steganographic encoding comprises at least one of rotation, scale and translation.

B5. The document or banknote of any one of B1-B4, wherein the first steganographic encoding comprises a first plural-bit message and the second steganographic encoding comprises a second plural-bit message, and wherein the cooperation comprises a redundancy or cross-correlation of the first and second messages.

B6. The document or banknote of any one of B1-B4, wherein the first steganographic encoding and the second steganographic encoding are both detectable from a single optical scan of either the first surface or second surface.

B7. The document or banknote of any one of B1-B6, wherein the substrate comprises a first material and the window comprises a second, different material.

B8. The document or banknote of B7, wherein the first material comprises paper or a paper synthetic.

B9. The document or banknote of B7 or B8, wherein the second material comprises a plastic or polymer.

C1. A banknote or identification document comprising:
a substrate;
multi-color printing on the substrate, wherein the multi-color printing includes a first feature printed therein in a yellow color, wherein the yellow color first feature is obscured to an unaided human eye.

C2. A method of analyzing the banknote or identification document of C1 with a handheld computing device, wherein the handheld computing device comprises at least an optical sensor, electronic processing circuitry and a display, said method comprising:
receiving optical scan data of the banknote or identification document from the optical sensor;
providing blue channel color information for display on the display, wherein the first feature is readily perceptible on the display to an unaided human eye.

C3. The method of C2, wherein the device comprises a cell phone or personal digital assistant.

C4. The method of any one of C2 and C3, wherein the banknote or identification document comprises steganographic indicia encoded therein.

C5. The method of C4, wherein the steganographic indicia comprises registration data.

C6. The method of C5, wherein the registration data comprises or links to a second feature.

C7. The method of C6, wherein the device comprises instructions for execution on the electronic processing circuitry to: i) recognize the first feature; ii) generate for display on the display the second feature at an alignment relative to the first feature.

C8. The method of any one of C1-C7 wherein only blue channel color information is provided for display on the display.

C9. The method of any one of C1-C7 wherein the blue channel color information is emphasized relative to other color information when displayed.

Metallic Inks

Specialized, metallic inks have emerged which allow electronic circuitry (e.g., RFIDs) to be "printed" on document substrates.

Some examples of electronic circuitry are shown, e.g., in assignee's U.S. Pat. No. 6,608,911 and published U.S. Patent Application No. US 2003-0178495 A1 (allowed). Each of these documents is herein incorporated by reference.

One improvement embeds a digital watermark in a circuit layout itself. Subtle changes to line widths or ink contrast are employed in the circuit layout when it is printed, laid down, etched, or fabricated. For example, the line modulation techniques disclosed herein may be used to encode a watermark signal in a circuit layout. The subtle changes convey a digital watermark, which is detectable through optical scan data of the circuit. Even a circuit diagram can include the watermark embedded therein. Imagine a product label or product packaging that is printed with an RFID metallic ink layer. The layer is optically scanned and the watermark is discerned there from.

Identification documents and banknotes may include electronic circuitry. The circuitry may be passive, in that it requires an external energy or frequency source to excite the circuitry. The circuitry may be responsive at any desired frequency (e.g., even extending into the high Gigahertz range). The circuitry may include a variety of elements like miniature light emitting diodes and piezoelectronic or audio devices.

When excited by an appropriate stimulus (e.g., exposure to a particular energy or transmission frequency) the electronic circuitry is energized. In a first example, the identification document or banknote "shines" via the LED. The shinning provides an authentication clue. In a second example, the identification document or banknote vibrates via a miniature piezoelectronic transducer upon exposure to an appropriate stimulus. In a third example, the identification document or banknote emits an audible sound via a miniature piezo-audio device upon exposure to an appropriate stimulus. In a fourth example, a digital watermark carried by the identification document or banknote includes a key or seed value. The key or seed value, once decoded from the digital watermark, is used to tune the external stimulus to a particular frequency or setting. Once tuned, the stimulus excites or energizes the electronic circuitry.

In a related implementation, an identification document or banknote includes passive (or active) electronic circuitry. The electronic circuitry emits (perhaps only after external stimulation) a first frequency. A reader emits a second frequency, and employs a heterodyning process to generate a third frequency based on the first and second frequencies. The third frequency is used to determine authenticity of the document or banknote. In some implementations, the first frequency emitted by the electronic circuitry is used as a key or seed, which is used to select an appropriate second frequency for the heterodyning process.

Some possible combinations of this disclosure include the following. Of course, other combinations will be evident to those of ordinary skill in the art. We reserve the right to present these combinations as claims in this or continuing applications.

D1. A banknote comprising:
a substrate;
printing on the substrate; and
electronic circuitry carried on or in the substrate, wherein the electronic circuitry is passive and activates in response to a predetermined energy or frequency.

D2. The banknote of D1, wherein the electronic circuitry includes a piezo-electronic device.

D3. The banknote of D2, wherein the piezo-electronic device vibrates when the electronic circuitry is activated in response to the predetermined energy or frequency, the vibration providing a sensory authentication clue.

D4. The banknote of D2, wherein the piezo-electronic device emits an audible sound when the electronic circuitry is activated in response to the predetermined energy or frequency, the sound providing an audible authentication clue.

D5. The banknote of D1, wherein the electronic circuitry comprises a light emitting element which is activated in response to the predetermined energy or frequency, the activated light emitting element comprising a visual authentication clue.

D6. A reader cooperating with the banknote of any one of D1-D5, comprising:
an energy or frequency source;
a receiver to receive a first frequency emitted by the electronic circuitry;
a determination module to determine whether a frequency corresponds to an expected frequency, and if so, to provide a signal indicating such determination.

D7. The reader of D6, wherein the energy or frequency source excites the electronic circuitry.

D8. The reader of D6, wherein the energy or frequency source emits a second frequency, and wherein the determination module heterodynes the first and second frequencies to yield a third frequency, wherein the third frequency compared for correspondence to the expected frequency.

D9. A method comprising:
providing an electronic circuit on a surface through metallic ink, wherein the electronic circuit yields a plural-bit identifier when excited, and wherein the electronic circuit is provide so that an optical scan of the electronic circuit will yield a steganographic signal.

D10. The method of D9, wherein the steganographic signal is provided through subtle changes to lines of the electronic circuit.

D11. The method of D11 wherein the steganographic signal comprise plural-bit data.

D12. The method of any one of D9-D11 wherein the plural-bit identifier and the plural-bit signal coincide.

D13. The method of any one of D9-D12 wherein the electronic circuit comprises an RFID.

Figure 10:
FIG. 10 shows a relationship between cash and confidence.

Now with reference to FIG. 10, we detail a relationship between cash and consumer confidence. We refer to this figure as a "dumbbell" model. One the left side, cash (or money) is represented both in the physical world (e.g., paper banknotes and checks, etc.) and electronic or cyber world (e.g., digital cash and financial records/credit). The left side of the dumbbell is balanced by confidence and brand protection on the right side. In order for the cash to have any meaningful significance, a consuming base must believe or have confidence in the physical or electronic manifestation of the currency. An example is currency brand. Historically the US currency has been a strong "brand" of currency.

Digital watermarks are used to support the FIG. 10 model. For example, a digital watermark is used to bridge the gap between physical and electronic cash. A unique identifier is associated with an account or "credit". The watermark or unique identifier is associated with the electronic cash, and is conveyed when the credit is converted to a physical form. The watermark is used for authentication, as discussed above.

Security Through Metameric Ink Pairs

Inks and Dyes

A first embodiment of this aspect of the present invention employs a pair of similarly colored inks or dyes. For example, these inks may be termed so-called "metameric" inks.

Metameric inks work on a principle of metamerism; that is, two colors matching or approximating one another under one set of conditions can appear or behave quite differently under another set of conditions.

We preferably employ a pair of metameric inks that appear (visually) about the same under normal or visible lighting conditions. The term "about" in this application takes on its typical meaning of "approximately," "similar" or "close to," etc.

The inks differ, however, in that one ink in the ink pair is a metallic ink. The metallic ink includes metal pigments, platelets or other portions that provide the ink with metallic characteristics (e.g., radiation reflectance).

Arrangement on a Surface

Figure 11:
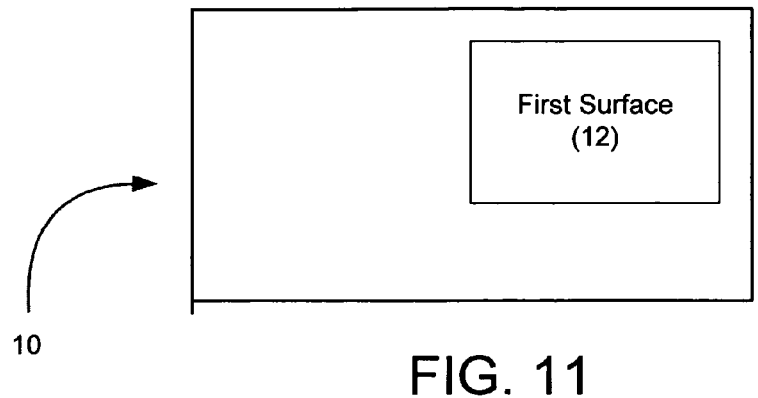
FIG. 11 illustrates a document including a first surface.

We arrange a pair of metameric inks on a first surface 12 (FIG. 11) of an identification or security document 10 to achieve at least two goals: 1) visual obfuscation of a metal ink; and ii) creation of a diffraction grating on the first surface via the metallic ink. Our use of the terms "diffraction grating" envisions a grating or pattern that can at least "reflect" or "diffract" energy or radiation. (We sometimes refer to a diffraction grating or pattern as a "metal grating," "reflection pattern" or "reflection grating.")

Figure 11A:
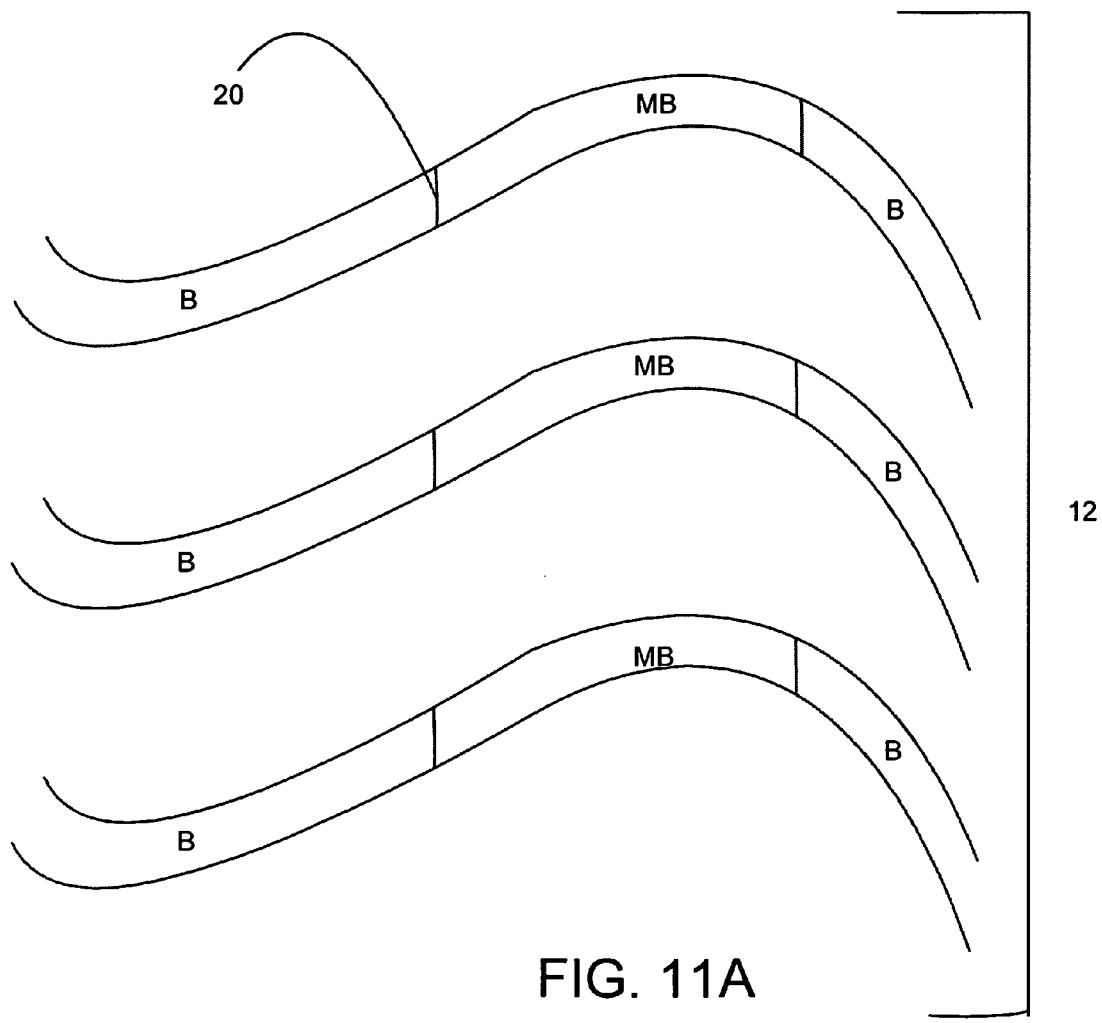
FIG. 11A illustrates an ink pair arranged in a pattern on the first surface of FIG. 11. This area is enlarged for the reader's convenience.

FIG. 11A illustrates a portion of the first surface 12. An ink pair is provided in a pattern. As illustrated, the pattern includes a line art image (e.g., such as are sometimes used in security documents, graphics, identification documents and the like). Of course, our techniques are not limited to line art images and can be employed in many other graphics, images and patterns as well.

Figure 12:
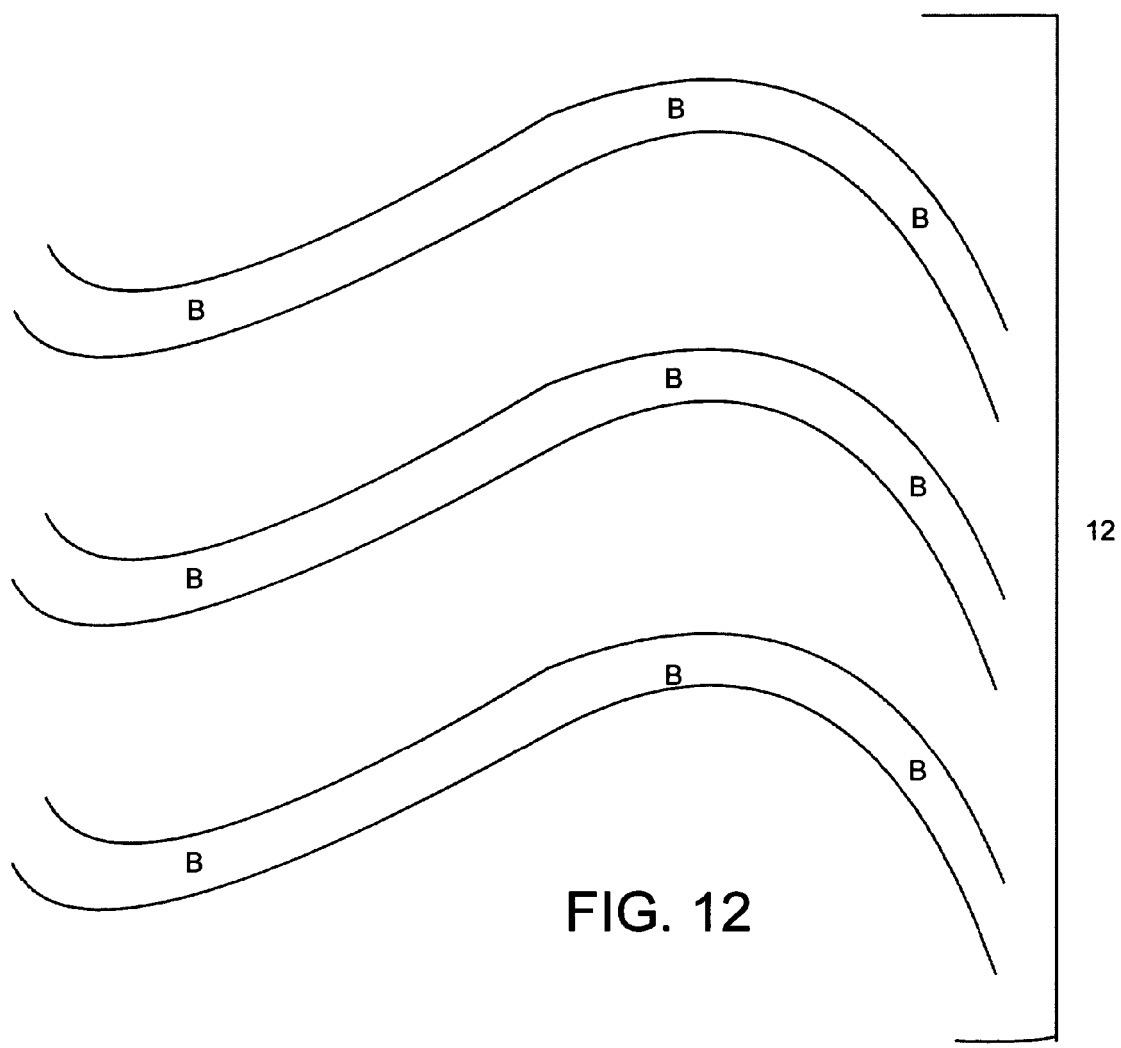
FIG. 12 illustrates the appearance of the FIG. 11A pattern to a casual human observer.

The ink pair, Blue (B) and Metallic Blue (MB), is arranged as shown in FIG. 11A. The Blue ink (B) and the Metallic Blue ink (MB) are arranged to form continuous lines on a surface. The lines appear continuous and about the same color (or at least very similar in color) to a casual human observer of the surface (FIG. 12). This similar appearance results since the Blue (B) ink and Metallic Blue (MB) ink are a metameric pair. A casual human observer is preferably not aware of the location of the metal ink—meeting goal no. 1 above. (We note that many ink and dye manufactures, e.g., including Pantone, Inc., with a North American office in Carlstadt, N.J. USA, provide matching metallic and non-metallic inks.)

The Blue (B) and Metallic Blue (MB) inks transition at position 20 as shown in FIG. 11A. Since some metallic inks have a "shine" or "luster," human observation of the transition 20 can be lessened by providing thin lines. In other embodiments, we provide lines or shapes in a dot matrix-like fashion. In those embodiments, we can overprint the Blue (B) ink into the Metallic Blue (MB) regions to lessen a stark transition.

The inks can be arranged in accordance with, e.g., known printing processes. In a preferred implementation, however, we employ a printing process including at least two printing plates. A first plate prints the Blue (B) ink and a second plate prints the Metallic Blue (MB) ink. Tight plate registration is preferred to achieve visually continuous patterns as shown in FIG. 11A. (We note that high end printing presses, like those used for printing security documents like currency, provide exceptional plate registration capabilities.) Of course other printing techniques can be used so long as sufficient printing registration of the non-metallic ink and the metallic ink is maintained.

Figure 13:
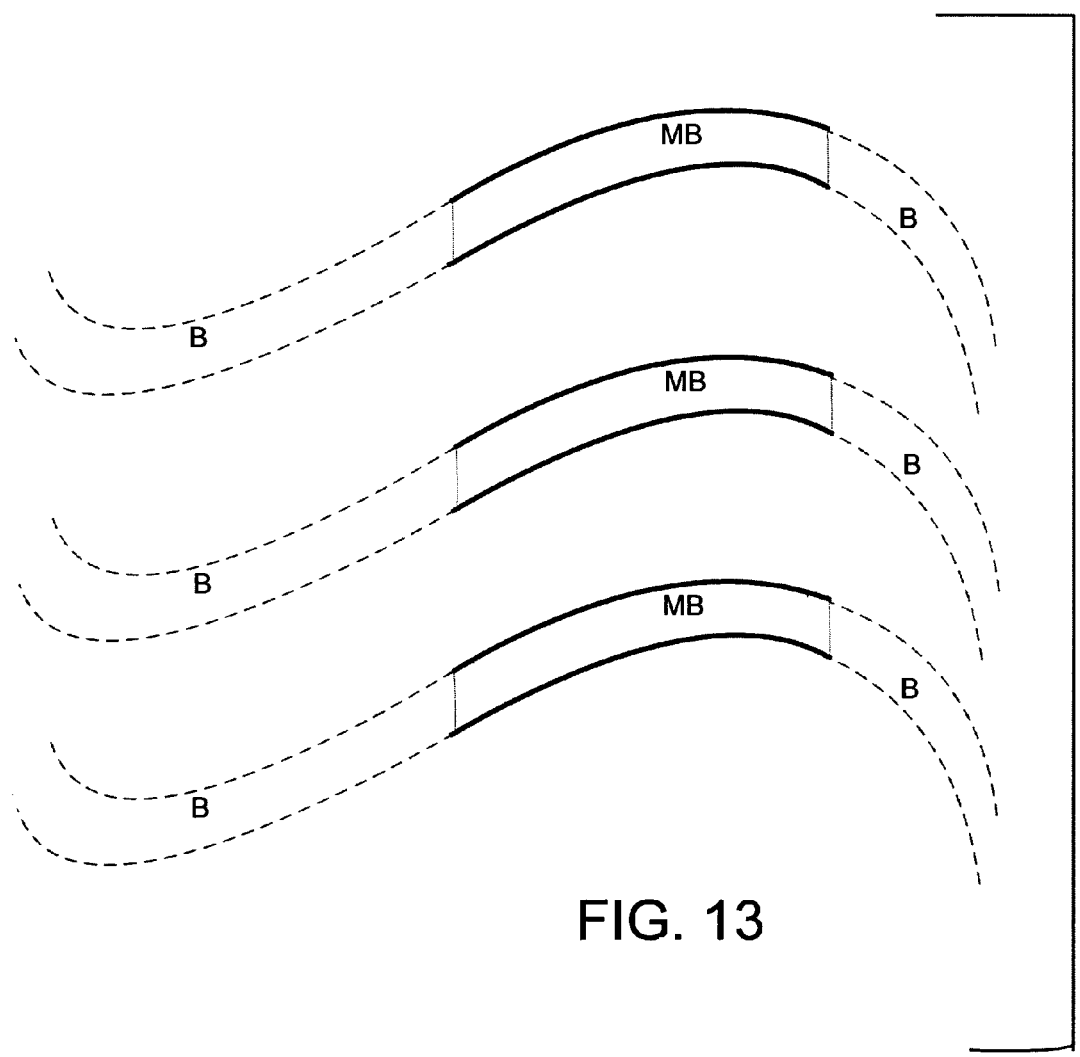
FIG. 13 highlights a portion of a diffraction grating for the FIG. 11A pattern.

With reference to FIG. 13, a Metallic Blue (MB) ink is provided to yield a reflection pattern (or diffraction grating). That is, the Metallic Blue (MB) ink includes reflective properties that, when arranged in a pattern on first surface 12, provide a diffraction grating capable of reflecting or diffracting high frequency radiation or illumination. A portion of the grating is shown with bolded Metallic Blue (MB) sections in FIG. 13. The illustration deemphasizes (shown with dashes) the non-metallic Blue (B) ink since Blue (B) ink lacks any significant contribution to the metal grating. The diffraction grating is designed to yield a desired frequency response (or reflection pattern) when illuminated with an energy or radiation source.

Some care is preferably taken when designing a diffraction grating.

In a first situation, where a designer has somewhat unfettered design discretion, a diffraction pattern is laid out (perhaps computer-assisted to achieve a particular reflection pattern, as is common nowadays), and then an obfuscation pattern is formed around the diffraction grating. For example, Metallic Blue (MB) ink is mapped to the diffraction grating design, and then Blue (B) ink is provided in concert with the Metallic Blue (MB) ink to form a visual design that helps conceal the location of the Metallic Blue (MB) ink.

In a second, perhaps more common situation, a host or carrier image is provided. For an identification document, the host image may include, e.g., a state seal or graphic, and for a security document, the host image may include, e.g., a bank logo, line-art or background pattern. Using the host image as a template, a diffraction grating is designed to blend within the host image—sometimes this process is referred to as generating an "interference" or "composite" image. The interference or composite image represents both the host image and the diffraction grating. If the host image includes line art, line segments are identified to host metallic ink that will form a diffraction grating. If the host image includes an image or graphic, regions within the image are identified to receive grating portions.

A shading or tinting effect might be added to a host image, where the shading or tinting comprises a plurality of parallel or smoothly curving lines provided with metallic ink. Such shading hosts the diffraction grating. A host image can also be filled in or created with "dots" or "blobs" where a set of the dots or blobs include fine lines or areas provided with metallic ink (FIG. 11D). The set of dots or blobs collectively provide a diffraction grating. Non-metallic ink dots or blobs can be intertwined with their metallic cousins to obfuscate the location of the metal dots—and consequently the location and design of the diffraction grating. (More generally, metallic dots can be laid down to provide a diffraction grating on a surface of a security or identification document.)

Regardless of the technique used, identified areas of a diffraction grating are used to guide metallic ink placement.

Line spacing for a diffraction grating is preferably determined with consideration of the illumination source (e.g., 60-75. GHz), so that the grating can accommodate the radiation or illumination wavelengths and provide a desired reflection beam or pattern response. We prefer that our lines be on the order of about a millimeter or less, but other dimensions can be used according to a given design criteria. Distance between lines or dots can be adjusted to accommodate a desired reflection response, as is known to those of ordinary skill in the art.

In some implementations we use a pseudo-randomly generated spatial pattern to help identify locations for placing metallic ink. Once locations are identified, metallic ink is laid down to provide a reflectance pattern. A key (perhaps assigned to an issuing authority) can be used to seed a pseudo-random pattern generator.

Figure 11B:
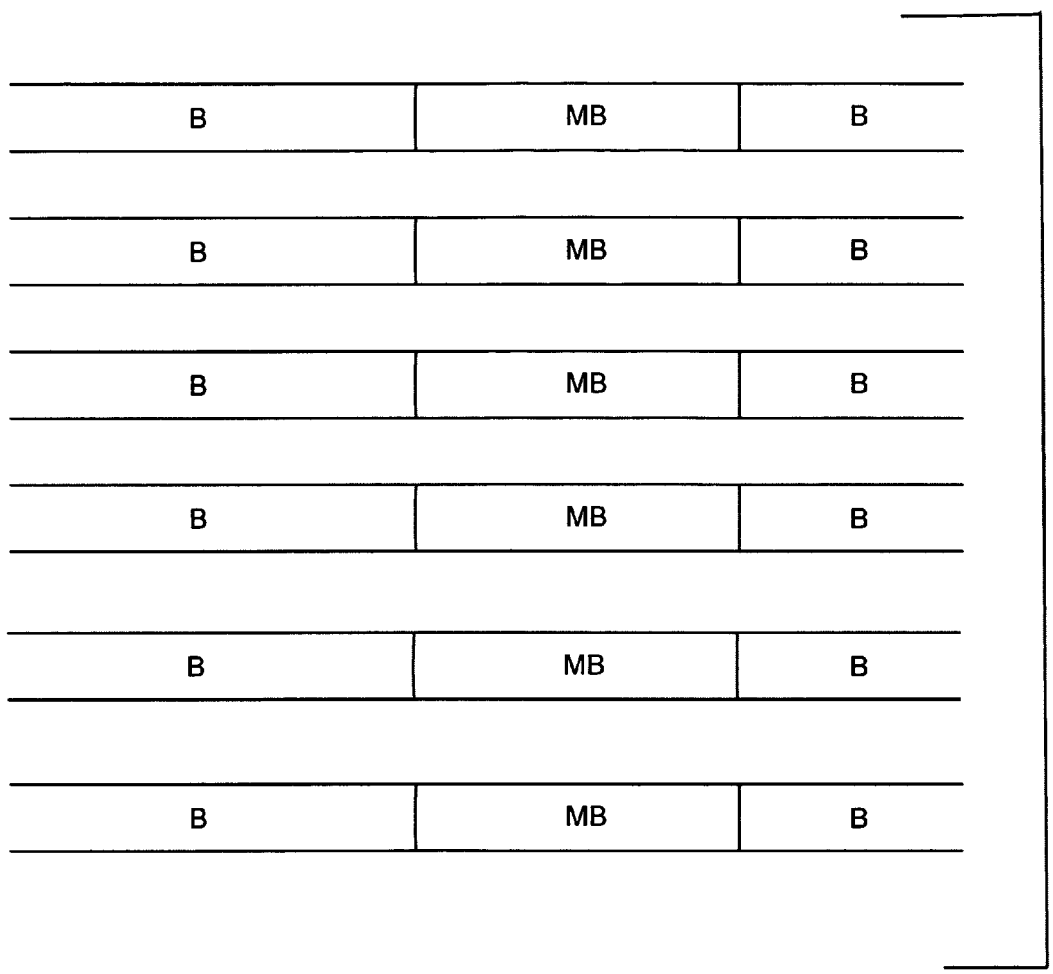
FIGS. 11B and 11C illustrate ink pairs arranged in alternative patterns.
Figure 11C:
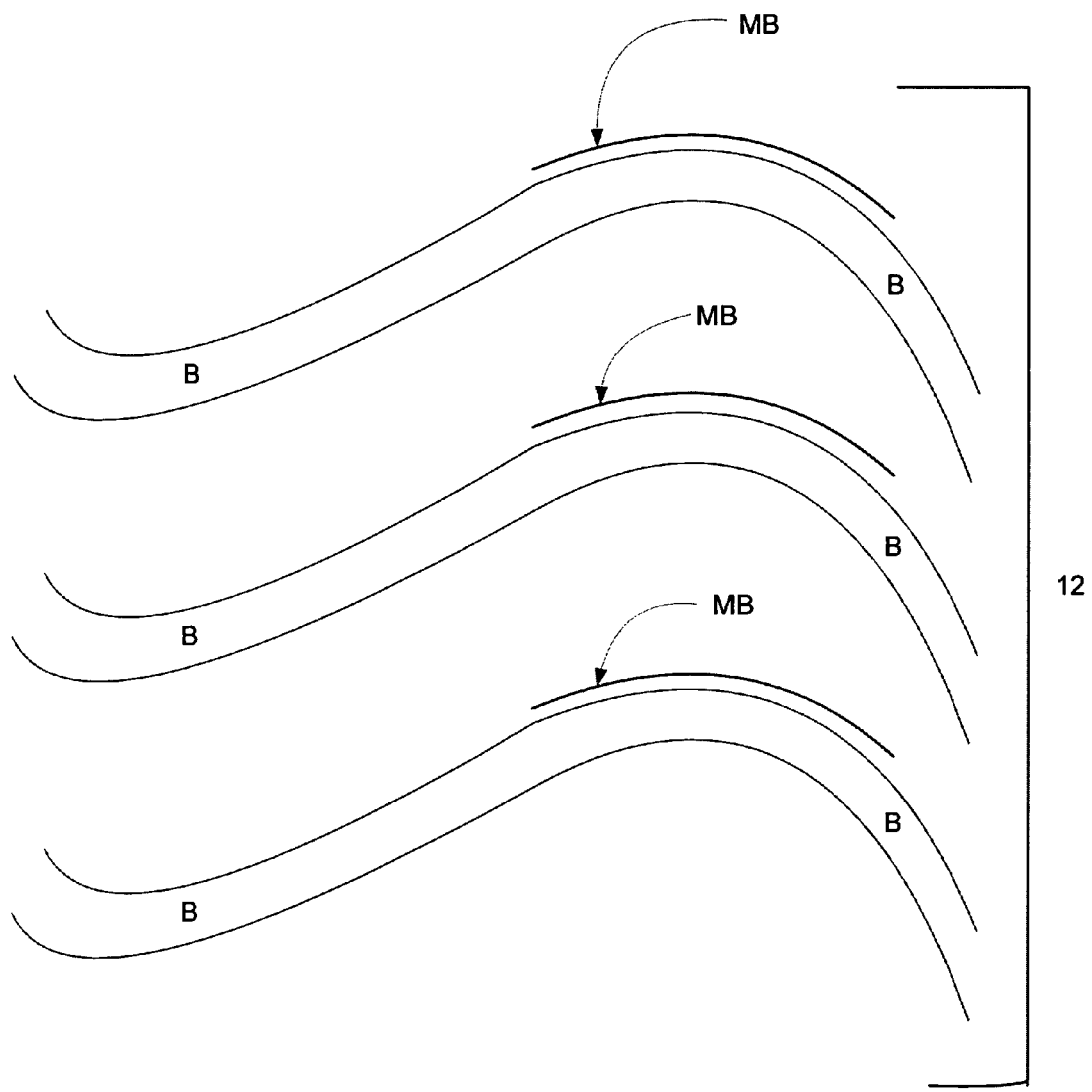
Figure 11D:
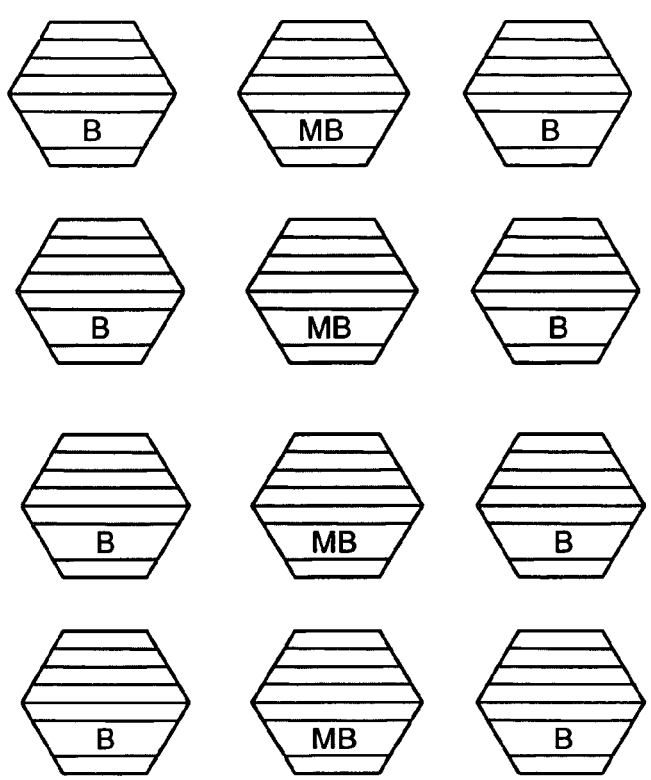
FIG. 11D illustrates ink dots or blobs arranged to provide a reflective pattern. The dots or blobs are enlarged for the reader's convenience.

Still other examples of arranging ink pairs are shown in FIGS. 11B and 11C. FIG. 11B shows parallel lines, resulting in a somewhat typical diffraction grating formation. The straight lines contrast to the curvilinear grating shown in FIG. 11A. FIG. 11C illustrates Metallic Blue (MB) ink that is over-printed or printed adjacent to selected segments of Blue (B) ink. This technique lays down a thin line or shadow at selected areas. This technique can be advantageously used to obfuscate locations of the Metallic Blue (MB) ink as well.

Of course there are still many other arrangements that can be made to visually obscure a metal ink while providing a diffraction grating. We note that some implementations will have a transition area between first and second inks. This transition area allows for a gradual change between first ink and the second ink, which will help if inks noticeably differ in color or sheen.

Excitation or Energy Source

Figure 14:
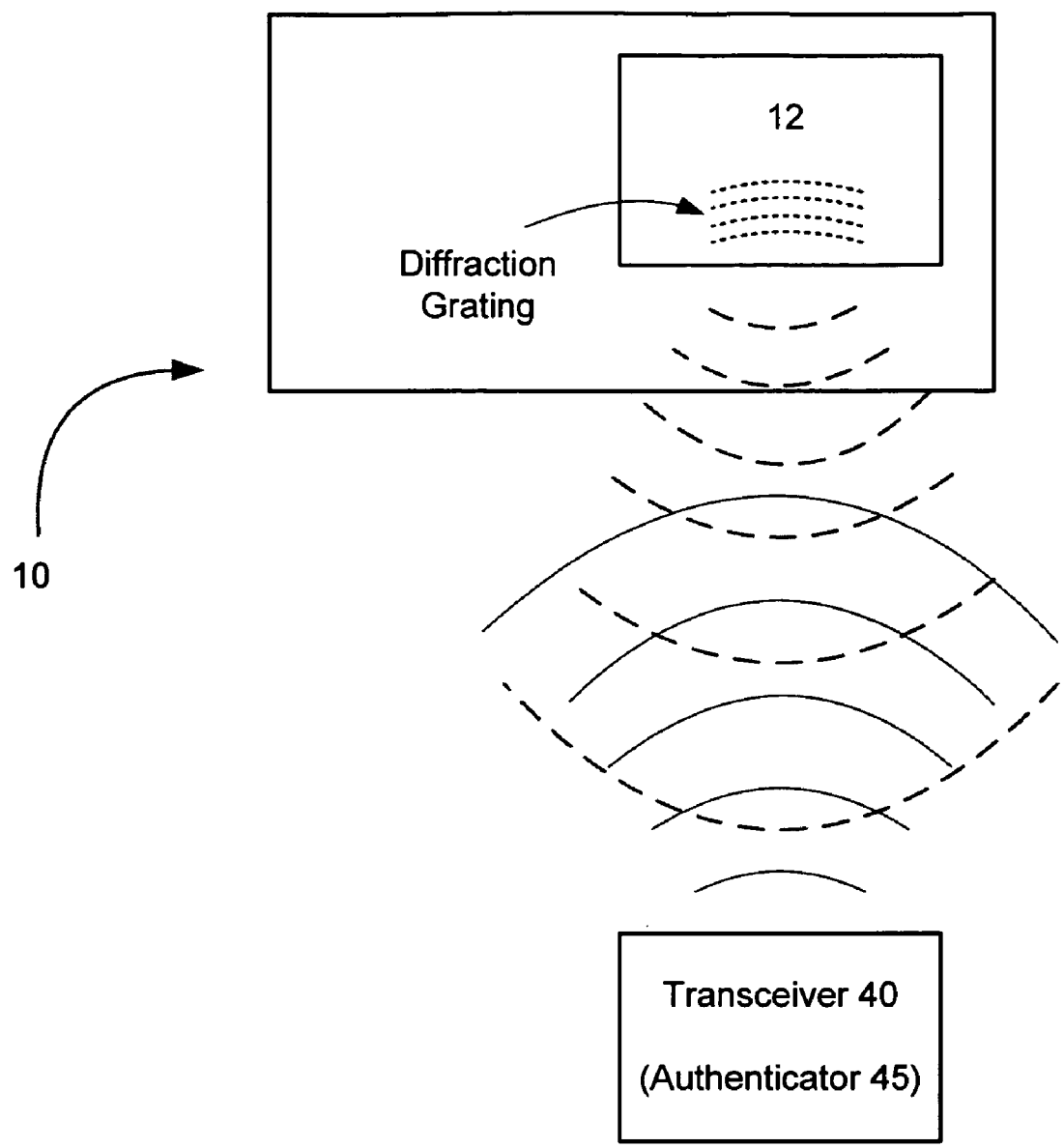
FIG. 14 illustrates pattern detection for a transceiver/authenticator.

An excitation source excites the diffraction grating, e.g., excites the Metallic Blue (MB) ink, as seen in FIG. 14. An excitation source (e.g., transceiver 40) preferably illuminates in the range of 50-80 Gigahertz, but most preferably in the range of 60-75. Gigahertz. The source can be accommodated in a handheld device (e.g., a keychain FOB, adapted cell phone, or the like) or mounted at a stationary location (e.g., point of sale location).

In a first implementation the excitation source 40 emits a burst (or chirp) at a predetermined frequency (e.g., 72 Gigahertz). The diffraction grating or pattern (metallic ink) reflects the energy in a pattern in accordance with its design.

In a second implementation the energy sources emits a chirp or burst that cycles through a range of frequencies (e.g., ramps up from 60 GHz to 75 GHz, and then perhaps back down to 60 GHz again). The chirp signal reflects from the diffraction grating or pattern in accordance with the grating's pattern.

Illumination and resulting reflectance is shown, albeit in a simplified manner, in FIG. 14. Transmitted radiation (or energy) is shown with solid lines and reflected radiation is shown in returning hashed lines.

The excitation source includes a receiver, perhaps even a MIMO (multiple inputs, multiple outputs) or SIMO (single input, multiple outputs) receiver, which includes multiple transmitters and receptors.

An authenticator module 45 (FIG. 14) determines a signature from reflected radiation patterns (e.g., reflection or beam patterns or a plurality of "peaks" representing reflection angles or phase relationships, etc.) over the cycled frequency range or a reflection pattern corresponding to a single reflection. The signature need not include all features from a reflected pattern, but instead may include one or more attributes of a received reflectance pattern. If using multiple transmitters and/or receivers, a signature may contemplate received interference patterns as well. The authenticator module 45 determines whether the signature matches (or coincides within a predetermined tolerance) an expected signature.

Different organizations (e.g., different states when issuing driver's licenses) can each be assigned a unique signature (and corresponding grating pattern). Different types of documents can be similarly distinguished (e.g., a first signature for a passport, and a second different signature for a visa, or a first signature for a first denomination of currency and a second different signature for a second denomination of currency).

The authenticator module 45 may cycle through a list of expected patterns to determine whether a received pattern matches at least one of the expected patterns.

The identification document or security document is authenticated when a signature matches (or coincides within a predetermined tolerance) an expected pattern or signal. The document is considered suspect absent such a match.

Combined with Watermarking

In some cases we prefer a subtle color or contrast variance between the first ink and the metallic ink. The color or contrast variance is slight so as to be generally unnoticeable by a casual human observer. The metallic and non-metallic inks are arranged to provide both a diffraction grating and a digital watermark.

For example, Line Width Modulation techniques (LWM) or Line Continuity Modulation (LCM) techniques can be used to pattern a digital watermark (see, e.g., Published Application No. US 2005-0041835 A1 and U.S. Pat. No. 6,449,377).

The digital watermark pattern can be considered when designing a diffraction grating. (Redundant encoding and error correction encoding can help ensure that both a watermark signal and a diffraction grating are sufficiently produced.) Thus, an identification document includes both a watermark (observable from scan data) and a diffraction grating (verified through received radiation patterns) conveyed through the same pair of inks.

Organic Light Emitting Diodes

Organic polymers and other materials have recently led to the commercial viability of so-called "organic light emitting diodes" or "OLED" display (or "array" or "matrix"). OLEDs and methods of manufacturing such are further discussed, e.g., in U.S. Pat. Nos. 6,664,564, 6,670,052, 6,774,392 and 6,794,676, which are each hereby incorporated by reference.

An improvement is to provide an OLED display on an identification document or banknote.

One can imagine the possibilities. An OLED display can provided a luminous pattern, perhaps to show an expected currency denomination (e.g., text or number) or identification document type, or a graphic or seal. The displayed graphic or seal may include a hidden signal, e.g., a digital watermark embedded therein. An optical scan of the OLED will include the hidden signal embedded in the graphic or seal.

With the aid of micro-circuitry, the luminous pattern can change. That is, the pattern can alternate between different patterns, or between text and patterns, etc.

The OLED display is provided on or in a first area of the document or banknote. In some implementations, but certainly not required, the first area is a see-through, thin plastic window. The OLED display can be activated with an on-document power supply, e.g., a micro battery. In other implementations, the document or banknote includes piezoelectric device(s). Friction or movement of the document or banknote activates the piezoelectric devices, which creates a current to activate the OLED display. In still other implementations, the OLED display includes or cooperates with passive circuitry; that is, circuitry that generates or responds to an electric field. The current is provided to the OLED display for activation. In still other implementations, a document or banknote includes a contact, and power is transferred to the document or banknote through the contact. Another possible power source is solar energy or other light source.

Related to the above discussion, in other implementations polymer thin film electronics are provided to create a layer of plastic with an array of transistors and LEDs across the surface of a film. The film layer is integrated within a document structure (e.g., laminate onto core layer, for example). The circuitry can be driven with a power supply, e.g., an on-document supply, such as a battery, or a contact or interface that receives power from an external power source. In either case the power energizes the LED array. The LED array can be used to display information, e.g., including information stored in the document (biometric information, demographic information, etc.). This is easy to imagine when the document includes electronic memory circuitry, e.g., such as is provided by a so-called smart card. Information from the memory circuitry is communicated to the LED array for display. But even paper thin documents, e.g., banknotes, can carry information. A series of transistors (e.g., organic TFT) are provided on the document, or in a layer of the document. The transistors form a memory cell, which can include information like a serial number, denomination, or hash of information printed on the document.

Information carried by the document or banknote can interact with external information supplied to the document through an interface. Consider a document that includes a wireless interface. The document receives information through the interface. In some implementations the information is a key (e.g., of a key pair) that decrypts information encrypted on the card with the other key of the pair (e.g., a private/public key pair). The decrypted information is displayed via the LED array. If the information is legible or expected the document is considered authentic, otherwise the document is considered suspect.

Of course, this technology has application in a wide variety of secure documents, including bank cards, financial instruments, bank notes, cards and documents, etc.

Some possible combinations of this disclosure include the following. Of course, other combinations will be evident to those of ordinary skill in the art. We reserve the right to present these and other combinations as claims in this or continuing applications.

E1. A financial instrument or identification document comprising:
- a substrate;
- a power supply carried on or in the substrate;
- electronic circuitry carried on or in the substrate; and
- an organic light emitting diode (OLED) display carried on or in the substrate and powered by the power supply and controlled or driven, at least in part, by the electronic circuitry.

E2. The financial instrument or identification document of E1, wherein the power supply comprises at least one of a battery, a passive-current generating device, solar or light conversion cell, and a piezoelectric device.

E3. The financial instrument or identification document of E1, wherein the electronic circuitry comprises memory with first information stored therein.

E4. The financial instrument or identification document of E3, wherein at least some of the first information is communicated to the OLED display via the electric circuitry for display thereon.

E5. The financial instrument or identification document of E4, wherein the at least some of the first information that is communicated to the OLED display comprises at least one of a currency denomination, a graphic, seal, text, and number.

E6. The financial instrument or identification document of E4 wherein the at least some of the first information that is communicated to the OLED display comprises first display information and second display information, wherein the electronic circuitry provides timing of the first display information and the second display information so that the first display information is first displayed by the OLED display and then the second display information is displayed by the OLED display.

E7. The financial instrument or identification document of any one of E1-E6 wherein the instrument comprises at least one of a banknote, currency, check, note, draft, traveler's check, security interest, bond and certificate.

E8. An identification document comprising:
- a substrate;
- a power supply carried on or in the substrate;
- electronic circuitry carried on or in the substrate; and
- a light emitting diode (LED) matrix carried on or in the substrate and powered by the power supply and controlled or driven, at least in part, by the electronic circuitry.

E9. The identification document of E8 wherein the electronic circuitry comprises polymer-based thin film electronics.

E10. The identification document of E8 wherein the electronic circuitry and LED matrix are carried by a thin film layer carried by the substrate.

E11. The identification document of E10 wherein the thin film layer is laminated to the substrate.

E12. The financial instrument or identification document of E3, wherein the first information comprises an encrypted form.

E13. The financial instrument or identification document of E12, wherein the document or instrument further comprises an interface to receive second information.

E14. The financial instrument or identification document of E13, wherein the second information comprises a key to decrypt the first information prior to display on the LED display.

E15. The financial instrument or identification document of E3 wherein the substrate comprises at least one of printing, engraving and a photograph, and the first information comprises information that corresponds to or is redundant with the printing, engraving and photograph.

E16. The financial instrument or identification document of E15 wherein the substrate comprises multiple, separate layers.

E17. The financial instrument or identification document of any one of E1-E7 and E12-E16, wherein the instrument or document comprises at least one of a banknote, currency, check, note, draft, traveler's check, security interest, bond and certificate, driver's license, passport, visa and national id.

Interference of Thin Films

A phenomenon of light interference in thin films (e.g., think of soapy water) is well understood and has been leveraged to create a broad array of security features since copying or altering objects with these types of "light interference" features is difficult.

Constructive and destructive interference of light due to internal reflection at a boundary of the thin film creates a desired effect of shifting spectral reflection as a function of several different parameters, most notably an "angle of incidence."

A simple example of this effect is shifting of spectral reflection of soapy water from a center point of 536 nm to 455 nm when the angle of incidence moves from normal to 45 degrees.

Figure 18:
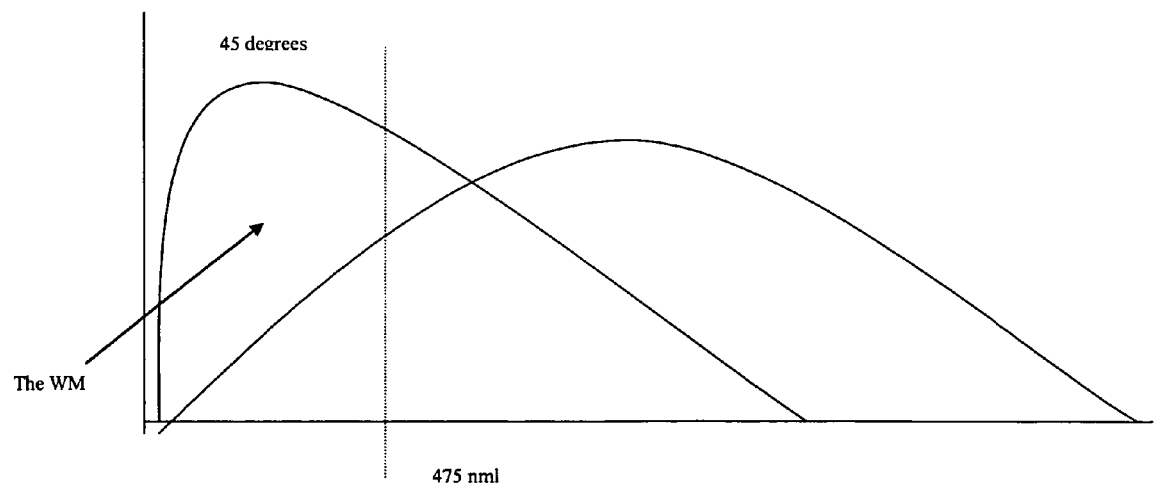
FIG. 18 is a diagram illustrating observation of a watermarked image at an off-normal viewing angle.

This property of shifting spectral reflection can be used to create a digital watermark that can only be observed by viewing a watermarked image at an angle off normal (see FIG. 18). The modulation in spectral response (e.g., the watermark itself) is created by varying a thickness of the film, which can be accomplished by any number of techniques including screening of the image (assuming it is being printed with pearlescent ink that displays these properties) or the film itself can be produced to vary in thickness.

To recover the watermark, the document is illuminated with white light and viewed at the specified angle. The recover process can be augmented by using an equivalent of, e.g., a notch-filter or with illumination of a specific wavelength (e.g., truncating higher spectral frequencies, with reference to the dashed line in FIG. 18).

The techniques centered on a single film can be easily extended to multiple films that are stacked to create much larger shifts in spectral response.

In another embodiment, this increase in spectral shifts, combined with more complex behaviors, can be used to impart a number of different behaviors on a watermark itself. For example:

Increased Fragility: Frequency band where a watermark appears is tightly controlled, such that only with very narrow-band illumination or with a notch filter can the watermark be read.

Tamper Evidence: By imparting fragility in the structure itself (e.g., varying the adhesives between films) a watermark is designed such that a component of the watermark is carried in the fragile film, such that if the document is tampered with and the film was separated, the watermark would no longer read. A variant of this is having a watermark appear if tampering occurs. This can be abstracted to create a system wherein integrity of a thin-film based security feature can validated in an automated fashion, layer by layer.

Interdependence: Similar to physical security, a watermark can only be read by knowing the "recipe" of where and how to illuminate a structure to recover the watermark. This recipe may include multiple observation points, illumination sources and filtering. All requiring that all the observed spectral shifts are co-located such that the watermark is still readable (e.g., think of plate-registration, but taken to three dimensions. Each layer must be registered (X,Y) and the thickness has to be correct (Z)).

Appearance of disappearance of wave-bands: In another embodiment, a perceived double to single waveband shift (e.g., both spectral responses shift, but one might shift into UV, hence making it non-visible) is used to weaken or allow a watermark to appear.

Retroreflection

Retroreflection as phenomena has been leverage from security applications (e.g., 3M's Confirm laminate) for safety clothing (e.g., a reflective vest for running at night). The angle of reflection and spectral response can now be controlled through various manufacturing processes.

Through the modulation of both of these parameters (i.e., angle of reflection and spectral response, as well as other parameters) a watermark can be encoded in retroreflective material. Similar to the prior embodiment using thin films, the watermark appears, disappears or changes (including yielding a different payload at different observation angles) as a function of the observed angle.

WORM Watermark

Prior to the mass availability of CD Burners and acceptance of such into the common vernacular (to "burn" something means the permanent writing of) this functionality was referred to as Write Once Read Many (i.e., "WORM"). Many embodiments of this existed, where only portions of the disk were writeable, etc.

A digital watermark equivalent is one that allows its payload (e.g., plural-bit message) to be encoded and embedded and then altered in the field after a watermarked image is produced on a substrate.

For example:

Encode watermark template in a substrate, but add/modify message to the substrate after production by using techniques such as is used in DCards, where the substrate itself is heated locally and causes a "browning" of the PVC substrate where heated.

Destroy specific "cells" within retro-reflective laminate to locally change the spectral response when viewed at a specific angle.

For statistics-based encoding or decoding, remarking "resets" the statistics of the image, so that the image can be re-marked. Remarking does have visual impacts though, so only a limited number of overwrites are currently possible.

Physical Random Functions in Security Printing

Advances in digital imaging and printing technologies have vastly improved desktop publishing, yet have provided counterfeiters with low cost technologies for illegally counterfeiting security documents (e.g., banknotes, checks, notes, drafts, and other financial instruments) and identification documents (e.g., driver's licenses, passports, ID documents, visa, etc.). While there are many technologies that make counterfeiting more difficult, there is a need for technologies that can quickly and accurately detect originals and distinguish copies. Preferably, these technologies integrate with existing processes for handling such documents.

By way of some additional background, and with reference to the semiconductor world, we often find naturally occurring variances in circuit manufacturing. For example, doping levels of production materials (e.g., semi-conductors) slightly vary from device to device. These slight variations have been leveraged to create addressable logic, and are sometimes referred to as "Physical Random Functions" (or "PRFs" or "PUFs").

This addressable logic (or, more generally, the device's unique variations) are used to uniquely identify a specific circuit, used as a seed for a random number generator and even used as a key for a cryptographic process. One advantage of Physical Random Functions is that they are based on what is believed to be fundamentally random process that is hard to control or predict; hence, the random features are hard to counterfeit.

Many printing process have a number of PRFs as well. The variations or functions have been used in forensic analysis of documents and to identify types of printers. See, e.g., Mikkilineni, et al., "Printer identification based on graylevel co-occurrence features for security and forensic applications," in Security, Steganography, and Watermarking of Multimedia Contents VII, edited by Edward J. Delp III, Ping Wah Wong, Proceedings of the SPIE-IS&T Electronic Imaging, SPIE Vol. 5681, pages 430-440 (2005), which is herein incorporated by reference. Such variations or functions might include plate registration, ink density, dot gain, printer characteristics, and other printing characteristics. For inkjet or toner based systems, variations or distinctive patterns in ink/toner spray, banding artifacts or drop-outs can be identified.

We extend the use of PRF features to create a machine-readable (or at least a machine-observable) feature that can be read in an automated fashion for printed security and identification documents.

Figure 15:
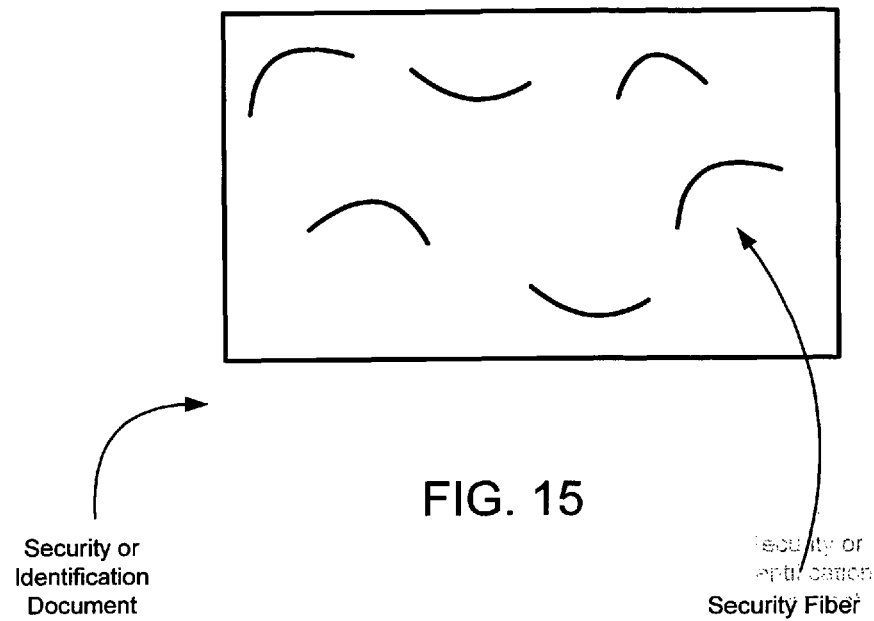
FIG. 15 illustrates an exaggerated view of a security document including security fibers.

One implementation relies on a random placement of so-called security fibers during security document manufacture. Security paper fibers are sometimes mixed in with raw paper pulp during paper manufacture. Some times the paper pulp is a cotton and linen concoction. (For identification documents, fibers or fluorescent particles can be mixed in a document substrate or layer during, e.g., a molding process.) Some currencies leverage color fibers (some of which are UV sensitive) in their paper making process, see, e.g., the Crane & Co. paper. Due to the introduction of the fibers in the paper pulp, the fibers are lodged in the substrate as opposed to being on the surface. The fiber's placement within the substrate protects them from undue soiling and wear. An exaggerated example of such fibers in a document is shown in FIG. 15. These fibers find themselves arranged in a security document in a random manner—akin to Physical Random Functions seen in semiconductor devices.

The random arrangement of such fibers allows for a calculation of a unique signature or fingerprint based on the fibers. Such features can be observed with an optical imager (e.g., optical scanner or cell phone camera) or some other instrument typically used in the field (e.g., magnetic head for magnetic characteristics, IR or UV camera for out-of-visible spectrum characteristics, etc.). The signature or fingerprint can include a representation of a spatial relationship of all fibers or a set of fibers. This representation, once determined, can be used to seed a number generator or hashing algorithm. The resulting number is the unique identifier. Or a slope of one or more of the security fibers can be calculated and used as an identifier; related is a calculation of a second derivative for one or more of the fiber's shape (or slope curvature). The result is used as an identifier or as a seed to a number generator or hashing algorithm. Of course other identifying techniques based on the security fibers can be used as well.

The result of such calculations is an identifier that uniquely represents a security document based on the PRF nature of the security fibers.

Applications of PRF's

One application using PRFs is tracking and monitoring. Documents are monitored as they flow through distribution centers. An optical scanner scans each document (or a sampling of such documents) as the documents flow by. The optical scan data is analyzed by a monitor (e.g., software or hardware monitor) to calculate unique identifiers for the respective documents.

One can imagine a counterfeiting scenario that includes copying one document and reproducing it time and time again. (The fibers are represented with color ink in the copies. Each copy will then have the same PRF characteristic as its parent document.) If a monitor recognizes the same or statistically similar identifiers time and time again, the monitor can issue an alert for an emerging counterfeiting threat.

PRF's Combined with Other Machine Readable Features

As discussed above, a PRF can be used to create a unique identifier for a document (e.g., a 256-bit identifier). A unique identifier can be used in cooperation with digital watermarking and other machine-readable indicia.

For example, a digital watermark embedded in a document may carry a number resulting from PRF analysis.

(Behind the scenes, a PRF is read from an unprinted document substrate, e.g., via optical scanning of the substrate. Resulting optical scan data is analyzed and a unique identifier based on the PRFs is generated there from. The unique identifier is provided to an embedder. The embedder embeds the unique identifier as, e.g., a digital watermark or overt 2-D symbology. The watermarking or symbology is provided on the document during printing.)

In another, related embodiment, a document is modified each time it is inspected and validated. For example, a document is modified in some machine-recognizable fashion each time the document passes through a centralized facility. A document can be subtly reprinted to include another machine-readable component (e.g., a digital watermark component). Perhaps the component is only one or two bits (e.g., introduced through changing luminance characteristics of the document at predetermined areas, or relative to other digital watermark components). But the bit change indicates an inspection and successful validation. The document is subsequently modified each time it is inspected and deemed valid. (A validity determination is made based on a successful calculation and verification of the PUF. For example, the PUF is checked against a "watch list" of suspected identifiers, or can be compared to a machine-readable version of the same.). Instead of modifying the document through printing, other techniques like exposure to predetermined light or radiation may be used. In these later cases, the document includes, e.g., photosensitive materials that change with exposure to the light or radiation.

Some possible combinations of this disclosure include the following. Of course, other combinations will be evident to those of ordinary skill in the art. We reserve the right to present these and other combinations as claims in this or continuing applications.

F1. A method of monitoring for counterfeited documents comprising:
optically scanning a plurality of documents;
identifying a physically random function associated with each of the plurality of documents;
determining if the physically random function associated with each of the plurality of documents are statistically similar; and
signaling such a similarity when it arises.

F2. The method of F1 wherein the physically random function is determined from fibers found in the documents.

F3. A method comprising:
determining a physically random function (PRF) associated with a document;
representing the PRF as a plural-bit identifier; and
steganographically embedding the plural-bit identifier in artwork or graphics carried by the document.

F4. The method of F3 wherein the graphics comprise at least a photograph of an authorized bearer of the document.

Advances in First-Line Defenses

Historically, "first-line" inspection has referred to inspection techniques that are carried out through visual inspection and/or touch. First-line inspection has been a cornerstone of security printing since its inception.

Technology proliferation has forced reevaluation of first-line inspection techniques, both from a threat and benefit side. Counterfeiting technology has advanced to a point where any first-line techniques are now easily counterfeited. At the same time high-quality imagers with significant resolution (300 DPI+) are being widely distributed (e.g., on cell phone cameras).

A series of first-line "+" approaches are needed. We outline a few "+" approaches below. Some of these approaches modify existing features that are inspected with aid of widely available consumer devices. Other approaches introduce new features and functionality. Examples of available consumer devices include, e.g., cell phones, PDAs (e.g., think Pocket PCs) and portable music players, each that include an optical imager (or camera) and a display. These devices are augmented to include software to facilitate the functionality noted below. Instead of software, hardware implementations are acceptable as well. (Artisans of ordinary skill will be able to make and use such software without undue experimentation given this disclosure relative to what is already known in the art.)

In a first implementation a document includes extraordinarily small micro-print that is imperceptible to the naked human eye. A user (e.g., at a point of sale location) optically scans a document with her camera-equipped cell phone. Software executing on the cell phone analyzes the optical scan data, finds and then magnifies the micro-printing, and presents the magnified micro-printing via a device display. The software may include a character recognition module that allows recognition of the micro-printing. If an error is found in the micro-printing (or if an expected error is not found) the device preferably prompts the user of such. Preferably, only those document regions including such micro-printing are provided via display for user inspection. (In some cases the ASCII values of micro-printing are hashed and compared against a predetermined or expected value. The user is notified if the calculated and expected values differ significantly.).

In some variations of this first implementation, the micro-printing is provided on the document surface in proximity to a fiducial or hash mark. The fiducial provides a recognizable feature for the character recognition software. The fiducial's presence signals an expected presence of micro-printing. Once a region is identified as including the fiducial, a predetermined area around the fiducial is searched for expected micro-printing. The micro-printing is presented to a user via a device display.

In a second implementation, a document includes materials that fluoresce in the near-IR spectrum (e.g., many available inks have near-IR responses). While this fluorescence is beyond human perceptibly, many of today's devices (e.g., camera-equipped cell phones) are sensitive to this portion of the spectrum. The camera picks up features conveyed in the near-IR, which are presented to the user via the display. The use of near-IR in the art of security printing is well known. One variation of this second implementation includes a camera that picks up fluoresce or reflection from "hidden" features. These hidden features may be visible solely in the near-IR or may require an additional filter with a specific spectral response to highlight the feature. Another variation of this implementation involves illuminating a document with a light or strobe (a feature that is becoming common on cell phones & PDA's) that enable the feature to become visible.

Figure 16:
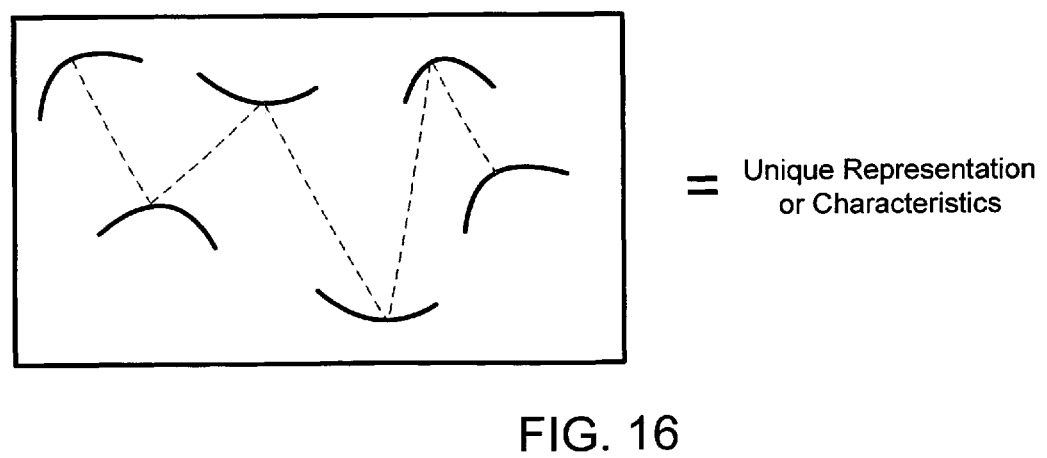
FIG. 16 illustrates a spatial mapping of the fibers shown in FIG. 15.

A third implementation harkens back to our above discussion of PRF's. Consider a document that includes security fibers or other visually perceptible features. A spatial mapping of the features is determined (see FIG. 16). The mapping is represented by an identifier or other characteristics. The identifier or characteristics are provided as a machine-readable component (e.g., as a digital watermark component or payload).

The digital watermark may also include a so-called orientation component, which is helpful in resolving image distortion such as rotation, scaling and translation. See, e.g., assignee's U.S. Pat. Nos. 6,704,869, 6,408,082, 6,122,403 and 5,862,260, which are each hereby incorporated by reference. In some cases a spatial mapping of the features is conveyed as a watermark orientation component, much like a mapping of fingerprint minutia discussed in assignee's U.S. Published Patent Application No. US 2005-0063562A1, published Mar. 24, 2005, which is hereby incorporated by reference.

Figure 17:
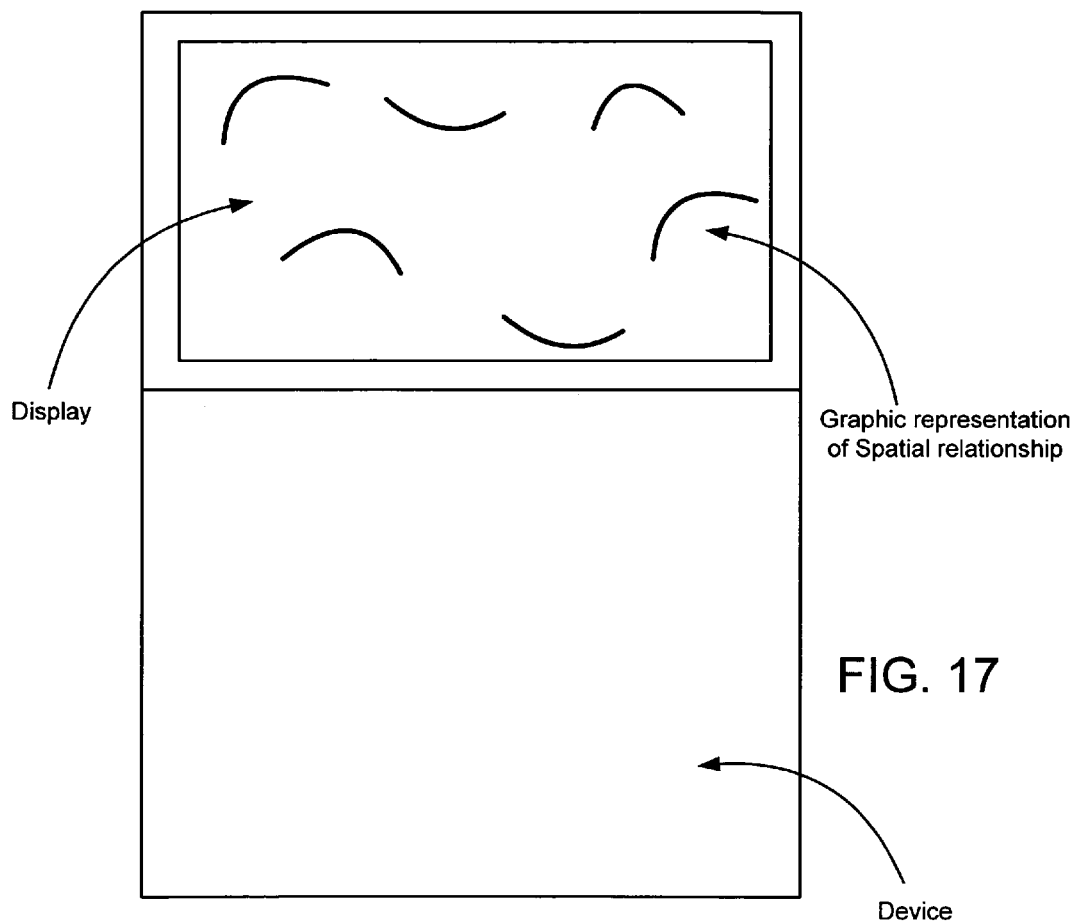
FIG. 17 illustrates a portable consumer device displaying the spatial mapping of FIG. 16.

A user scans a document with her camera (e.g., cell phone or PDA). A watermark reader reads a watermark from the scan data to obtain the embedded identifier or characteristics. Cooperating software reconstructs an expected, relative spatial placement of the security fibers based on the embedded identifier or characteristics. The expected spatial placement is provided to the user via the device display. The presentation may include, e.g., a graphical representation of an expected placement of security fibers relative to the document (see FIG. 17). The representation can include dots, lines, marks, etc. In some implementations, an image of the document is shown in the display (as captured by the device) and a graphical overlay is provided over the document to show the expected placement of the security fibers. A user can visually check the document to determine accurate placement.

Another variation automatically determines an actual placement of PRF indicators (e.g., security fibers) and presents via a device display the actual placement vs. the expected placement. The actual placement of PRF indicators is found through, e.g., analysis of optical scan data.

Instead of placement of security fibers, a watermark may reveal an expected location, shape or details of other document features such as designs, seals, etc.

A watermark payload may be secured through cryptographic means to provide additional security. A public key is provided to a user's device to decode a watermark payload. The public key can be used to validate a digital signature issued by a document issuing authority for the document being inspected. The hash used to create the digital signature would be based on a PRF or PUF. The digital signature would be created and embedded into a machine readable feature during printing.

A fourth implementation relies on so-called high-resolution watermarks (fragile, robust, tamper-evident, etc.). These watermarks may only be detectable through high resolution scanning. Resolutions of 10K DPI are common in security printing, this allows for machine readable features of the same resolution. By operating at this resolution, successful attacks would be required to operate at a similar resolution if not 2× (Nyquist). This places the features well outside the range of current imaging workflows (typically 1200-4800DPI) and hence outside of all but the most specialized of equipment usually reserved for security printers (e.g., Simultan Printing Presses, Jura RIPs, etc.). This frequency is also in a similar band to where naturally occurring PRF's typically appear (ink bleed, dot gain, voids, etc.).

A fifth implementation relies on audible feedback. A tone is generated by a device (e.g., cell phone, PDA, etc.) as an imager sweeps across a document. The tone is triggered, e.g., when a watermark is detected and/or when the watermark's payload matches or otherwise corresponds to the predetermined PRF characteristics. In some variations of this fifth implementation, an audible scale (e.g., think ring-tone) is influenced by the speed of the optical swipe. The ring tone will only sound or will vary in sound depending on the speed of the optical sweep (a simple gyroscope with speed measurement in the device can help facilitate this functionality). Of course, speed of optical sweep and watermark/PRF detection can be combined to generate a predetermined sound.

An important criteria in many of the above implementations is to leave the decision process of whether a document is authentic to a human observer, and not to a device. For example, if authentication relies solely on a device flashing a green light, signaling that a document is authentic, counterfeiting attacks will target the device. Such attacks might render device-determined authentication indications suspect.

Some possible combinations of this disclosure include the following. Of course, other combinations will be evident to those of ordinary skill in the art. We reserve the right to present these combinations as claims in this or continuing applications.

G1. A method of authenticating a security or identification document with a handheld computing device, the device comprising an optical sensor and a display, the document comprising micro-printing provided thereon, wherein the micro-printing is generally imperceptible by an unassisted human observer, said method comprising:

receiving from the optical sensor optical scan data corresponding to the document;

analyzing the optical scan data to recognize the micro-printing;

scaling or magnifying the micro-printing;

providing at least some of the scaled or magnified micro-printing via the display.

G2. The method of G1 wherein the document further comprises a micro-printed fiducial.

G3. The method of G2 wherein the micro-printing is recognized at least in part through identification of the fidicual.

G4. A handheld computing device comprising:

a display;

an optical sensor;

processing circuitry; and electronic memory, wherein said memory comprises executable instructions stored therein for execution by the processing circuitry, said instructions comprising instructions to carry out the method of any one of F1-F3.

G5. A method of authenticating a security or identification document with a handheld computing device, the device comprising an optical sensor, and at least a speaker, the document comprising machine observable features provided thereon, said method comprising:

receiving from the optical sensor optical scan data corresponding to the document;

analyzing the optical scan data to observe the features;

based at least on observed features, providing an audible signal via the speaker.

G6. The method of claim G5 wherein the audible signal is dependent on a speed at which the optical sensor is moved for scanning relative to the document.

G7. The method of claim G5 wherein the machine observable features comprise digital watermarking.

G8. The method of claim G7 wherein the machine observable features are randomly placed.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants hereby incorporate by reference each of the patent documents referenced above.

The methods, processes, and systems described above may be implemented in hardware, software or a combination of hardware and software. The methods and processes described above may be implemented in programs executed from a system's memory (a computer readable medium, such as an electronic, optical or magnetic storage device).

We have used Blue (B) ink and Metallic Blue (MB) ink in some sections of the above discussion for consistency and to ease the description. Use of these inks are for illustration only should in no way limit the invention. Indeed, we contemplate many different ink colors and finishes. We also contemplate use of more than two types of ink, and more than two printing plates. Also, reference to Pantone is for illustrative purposes also. There are many other suitable ink manufacturers.

Of course, photocopying (color copying) a security document including our metameric inks would be very difficult. First, the copy would need to include metallic ink capabilities. Further, even if a copying process included metallic ink, the metallic ink would need to be arranged so that it was not readily distinguishable (e.g., visually distinguishable) from the non-metallic ink and would need to be arranged in a diffraction pattern to yield an expected signature.

The particular combinations of elements and features in the above-detailed embodiments are exemplary only; the interchanging and substitution of these teachings with other teachings in this and the incorporated-by-reference patents/applications are also contemplated.

What is claimed is:

1. A method of authenticating a security or identification document with a handheld computing device, the device comprising an optical imager and a display, the document comprising a plurality of randomly or pseudo-randomly occurring features, the document further comprising steganographic indicia provided thereon, the indicia conveying expected characteristics of the features including expected spatial positioning information relative to the document, said method comprising:

receiving from the optical imager optical image or video data corresponding to the document;

analyzing the optical image or video data to obtain actual characteristics of the features, the actual characteristics of the features comprising actual spatial positioning information for the features on the document;

utilizing at least a configured multi-purpose electronic processor, analyzing the optical image or video data to obtain the expected characteristics of the features;

based at least on the expected characteristics and the actual characteristics of the features, providing user feedback via the display corresponding to an expected spatial positioning of the features relative to the document, the user feedback also corresponding to an actual spatial positioning of the features.

2. The method of claim 1 wherein the feedback comprising a graphical representation of the features relative to the document or a graphical representation of the relative spatial positioning of the features relative to the document.

3. The method of claim 1 wherein the device comprises a cell phone.

4. The method of claim 1 wherein the device comprises at least one of a personal digital assistant or a portable music player.

5. The method of claim 1 wherein the steganographic indicia comprises digital watermarking.

6. The method of claim 1 wherein the features comprise fibers and the expected characteristics are encrypted.

7. A handheld computing device comprising:

a display;

an optical imager;

an electronic processor or processing circuitry; and electronic memory, wherein said electronic memory comprises executable instructions stored therein to cause the processing circuitry or the electronic processor to carry out the method of claim 1.

8. A cell phone, personal digital assistant or portable music player comprising the device of claim 7.

9. A programmed computing device storing instructions in memory, said instructions are executable by said programmed computing device to perform the acts of claim 1.

10. A non-transitory computer readable media comprising instructions stored thereon to cause a multi-purpose computer processor to perform the acts of claim 1.

11. The method of claim 1 in which the optical imager comprises a cell phone camera.

12. A programmed computing device storing instructions in memory, said instructions are executable by said programmed computing device to perform the acts of claim 2.

13. A non-transitory computer readable media comprising instructions stored thereon to cause a multi-purpose computer processor to perform the acts of claim 2.

14. The method of claim 2 in which the optical imager comprises a cell phone camera.

15. A programmed computing device storing instructions in memory, said instructions are executable by said programmed computing device to perform the acts of claim 6.

16. A non-transitory computer readable media comprising instructions stored thereon to cause a multi-purpose computer processor to perform the acts of claim 6.

17. The method of claim 6 in which the optical imager comprises a cell phone camera.

* * * * *